(12) United States Patent
Heckerman et al.

(10) Patent No.: US 6,529,888 B1
(45) Date of Patent: Mar. 4, 2003

(54) GENERATING IMPROVED BELIEF NETWORKS

(75) Inventors: David E. Heckerman, Bellevue, WA (US); Dan Geiger, Tivon (IL); David M. Chickering, Los Angeles, CA (US)

(73) Assignee: Microsoft Corporation, Redmond, WA (US)

( * ) Notice: Subject to any disclaimer, the term of this patent is extended or adjusted under 35 U.S.C. 154(b) by 1524 days.

(21) Appl. No.: 08/739,200

(22) Filed: Oct. 30, 1996

Related U.S. Application Data

(62) Division of application No. 08/240,019, filed on May 9, 1994, now Pat. No. 5,704,018.

(51) Int. Cl.⁷ ............................................... G06N 5/04
(52) U.S. Cl. ....................................................... 706/45
(58) Field of Search ........................ 395/50–51, 75–77; 375/10–13

(56) References Cited

U.S. PATENT DOCUMENTS

| | | | | |
|---|---|---|---|---|
| 5,488,725 A | * | 1/1996 | Turtle et al. | 395/600 |
| 5,546,502 A | | 8/1996 | Hart et al. | 395/12 |
| 5,640,468 A | * | 6/1997 | Hsu | 382/190 |

OTHER PUBLICATIONS

Cowell et al, "Sequential model criticism in probabilistic expert systems," IEEE Transactions on pattern analysis and machince intelligence, vol. 15, No. 3, p. 209–219, Mar. 1993.*

Lin et al, "A minimal connection model of abductive diagnosis," IEEE conference on Intelligence Applications, p. 16–22, Mar. 1990.*

Bellazzi et al, Gamees II: An environment for building probabilistic expert systems based on arrays of bayesian belief networks, p. 546–553, May 1992.*

Musman et al, "A real time control strategy for bayesian belief networks with applications to ship classification problem solving," IEEE Conference on tools for artificial intelligence, p. 738–744, Jul. 1990.*

Deng et al, "A probabilistic approach to fault diagnosis in linear lightwave networks," IEEE Journal on selected areas in communications, vol. 11, No. 9, p. 1438–1448, Dec. 1993.*

Burnell et al, "Incorporating probabilistic reasoning in a reactive program debugging system," IEEE Expert magazine, p. 15–20, Feb. 1994.*

Regazzoni et al, "Distributed propagation of a-priori constraints in a bayesian network of markov random fields," IEEE Proceedings. Part 1: Communications, speech & Vision, p. 46–55, Feb. 1993.*

Gu et al, "An application of belief networks to future crop production," IEEE Conference on artificial intelligence applications, p. 305–309, Mar. 1994.*

Kumar et al., "Image Interpretation Using Bayesian Networks," *IEEE Transactions on Pattern Analysis and Machine Intelligence* 18(1):74–77, Jan. 1996.

(List continued on next page.)

*Primary Examiner*—Wilbert L. Starks, Jr.
(74) *Attorney, Agent, or Firm*—Amin & Turocy, LLP

(57) ABSTRACT

An improved belief network generator is provided. A belief network is generated utilizing expert knowledge retrieved from an expert in a given field of expertise and empirical data reflecting observations made in the given field of the expert. In addition to utilizing expert knowledge and empirical data, the belief network generator provides for the use of continuous variables in the generated belief network and missing data in the empirical data.

22 Claims, 14 Drawing Sheets

OTHER PUBLICATIONS

Kozlov et al., "A Parallel Lauritzen–Spiegelhalter Algorithm for Probabilistic Inference," *Supercomputing '94*, Jan. 1994, pp. 320–329.

Scheerer et al., "Expert System Tools for Describing and Predicting the Coastal Ocea Environment, " *Oceans '94*, vol. II. Jan. 1994, pp. 11–16.

Cowell, Roger G., "BAIES—A Probabilistic Expert System Shell with Qualitative and Quantitative Learning," *Bayesian Statistics 4*:595–600, 1992.

Cooper, Gregory F. and Edward Herskovits, "A Bayesian Method for the Induction of Probabilistic Networks from Data," *Machine Learning 9*: 309–347, 1992.

Spiegelhalter, David J., et al., "Bayesian Analysis in Expert Systems," *Statistical Science 8*(3): 219–283, Aug, 1993.

Goldman, Robert P., and Eugene Charniak, "A Language for Construction of Belief Networks," IEEE Transactions on Pattern Analysis and Machine Intelligence, vol. 15, No. 3, Mar. 1993.

Pearl, Judea "Probabilistic Reasoning in Intelligent Systems: Networks of Plausible Inference," 1988, pp. 387–396.

* cited by examiner

US 6,529,888 B1

GENERATING IMPROVED BELIEF NETWORKS

CROSS-REFERENCE TO RELATED APPLICATION

This application is a divisional of U.S. patent application Ser. No. 08/240,019, filed May 9, 1994 now U.S. Pat. No. 5,704,018.

FIELD OF THE INVENTION

The present invention relates generally to data processing systems and, more particularly, to the generation of belief networks.

BACKGROUND OF THE INVENTION

The advent of artificial intelligence within computer science has brought an abundance of decision-support systems. Decision-support systems are computer systems in which decisions, typically rendered by humans, are recommended and sometimes made. In creating decision-support systems, computer scientists seek to provide decisions with as high of a level of accuracy as possible. Thus, computer scientists strive to create decision-support systems that are equivalent to or more accurate than a human expert Applications of decision-support systems include medical diagnosis, troubleshooting computer networks, or other systems wherein a decision is based upon identifiable criteria.

One of the most promising new areas for research in decision-support systems is belief networks. A belief network is a representation of the probabilistic relationships among states of a portion of the world. The states of the world in a belief network can change and are, therefore, called variables. A belief network is expressed as an acyclic-directed graph where the variables correspond to nodes and the relationships between the nodes correspond to arcs. FIG. 1 depicts an example belief network 101. In FIG. 1 there are three variables, $X_1$, $X_2$, and $X_3$, which are represented by nodes 102, 106 and 110, respectively. The example belief network contains two arcs 104 and 108. Associated with each variable in a belief network is a set of probability distributions. Using conditional probability notation, the set of probability distributions for a variable can be denoted by $p(x_i|\Pi_i,\xi)$, where "p" refers to the probability distribution, where "$\Pi_i$" denotes the parents of variable $X_i$ and where "$\xi$" denotes the knowledge of the expert. The Greek letter "$\xi$" indicates that the belief network reflects the knowledge of an expert in a given field. Thus, this expression reads as follows: the probability distribution for variable $X_i$ given the parents of $X_i$ and the knowledge of the expert. For example, $X_1$ is the parent of $X_2$. The probability distributions specify the strength of the relationships between variables. For instance, if $X_1$ has two states (true and false), then associated with $X_1$ is a single probability distribution $p(x_1|\xi)$ and associated with $X_2$ are two probability distributions $p(x_2|x_1=t,\xi)$ and $p(x_2|x_1=f,\xi)$.

The arcs in a belief network convey dependence between nodes. When there is an arc from a first node to a second node, the probability distribution of the first node depends upon the value of the second node when the direction of the arc points from the second node to the first node. For example, node 106 depends upon node 102. Therefore, node 106 is said to be conditionally dependent. Missing arcs in a belief network convey conditional independence. For example, node 102 and node 110 are conditionally independent given node 106. However, two variables indirectly connected through intermediate variables are conditionally dependent given knowledge of the values ("states") of the intermediate variables. Therefore, if the value for $X_2$ is known, $X_1$ and $X_3$ are conditionally dependent.

In other words, sets of variables X and Y are said to be conditionally independent, given a set of variables Z, if the probability distribution for X given Z does not depend on Y. If Z is empty, however, X and Y are said to be "independent" as opposed to conditionally independent. If X and Y are not conditionally independent, given Z, X and Y are said to be conditionally dependent.

The variables used for each node may be of different types. Specifically, variables may be of two types: discrete or continuous. A discrete variable is a variable that has a finite number of states, whereas a continuous variable is a variable that has an uncountably infinite number of states. An example of a discrete variable is a Boolean variable. Such a variable can assume only one of two states: "true" or "false." An example of a continuous variable is a variable that may assume any real value between −1 and 1. Discrete variables have an associated probability distribution. Continuous variables, however, have an associated probability density function ("density"). Where an event is a set of possible outcomes, the density $\rho(x)$ for a variable "x" and events "a" and "b" is defined as:

$$\rho(x) = \lim_{a \to b}\left[\frac{p(a \leq x \leq b)}{|(a-b)|}\right]$$

Where $\rho(a \leq x \leq b)$ is the probability that x lies between a and b. Conventional systems for generating belief networks cannot use continuous variables in their nodes.

FIG. 2 depicts an example belief network for troubleshooting automobile problems. The belief network of FIG. 2 contains many variables 202, 204, 206, 208, 210, 212, 214, 216, 218, 220, 222, 224, 226, 228, 230, 232, and 234, relating to whether an automobile will work properly and arcs 236, 238, 240, 242, 244, 246, 248, 250, 252, 254, 256, 258, 260, 262, 264, 268. A few examples of the relationships between the variables follow. For the radio 214 to work properly, there must be battery power 212 (arc 246). Battery power 212, in turn, depends upon the battery working properly 208 and a charge 210 (arcs 242 and 244). The battery working properly 208 depends upon the battery age 202 (arc 236). The charge 210 of the battery depends upon the alternator 204 working properly (arc 238) and the fan belt 206 being intact (arc 240). The battery age variable 202, whose values lie from zero to infinity, is an example of a continuous variable that can contain an infinite number of values. However, the battery variable 208 reflecting the correct operations of the battery is a discrete variable being either true or false.

The automobile troubleshooting belief network also provides a number of examples of conditional independence and conditional dependence. The nodes operation of the lights 216 and battery power 212 are conditionally dependent, and the nodes operation of the lights 216 and operation of the radio 214 are conditionally independent given operation of the lights 216. However, the operation of the radio 214 and the operation of the lights 216 are conditionally dependent given the battery power 212. The concept of conditional dependence and conditional independence can be expressed using conditional probability notation. For example, the operation of the lights 216 is conditionally dependent on battery power 212 and conditionally independent of the radio 214. Therefore, the probability of the lights working properly 216 given both the battery power 212 and the radio 214 is equivalent to the probability of the lights working properly given the battery power alone, P(Lights|Battery Power, Radio, ξ)=P(Lights|Battery Power, ξ). An example of a conditional dependence relationship is the probability of the lights working properly 216 given the battery power 212 is not equivalent to the probability of the lights working properly given no information. That is, p(Lights|Battery Power, ξ)≠p(Lights|ξ).

There are two conventional approaches for constructing belief networks. Using the first approach ("the knowledge-based approach"), a person known as a knowledge engineer interviews an expert in a given field to obtain the knowledge of the expert about the field of expertise of the expert. The knowledge engineer and expert first determine the distinctions of the world that are important for decision making in the field of the expert. These distinctions correspond to the variables of the domain of the belief network. The "domain" of a belief network is the set of all variables in the belief network. The knowledge engineer and the expert next determine the dependencies among the variables (the arcs) and the probability distributions that quantify the strengths of the dependencies.

In the second approach ("called the data-based approach"), the knowledge engineer and the expert first determine the variables of the domain. Next, data is accumulated for those variables, and an algorithm is applied that creates a belief network from this data. The accumulated data comes from real world instances of the domain. That is, real world instances of decision making in a given field. Conventionally, this second approach exists for domains containing only discrete variables.

After the belief network has been created, the belief network becomes the engine for a decision-support system. The belief network is converted into a computer-readable form, such as a file and input into a computer system. Then, the computer system uses the belief network to determine the probabilities of variable states given observations, determine the benefits of performing tests, and ultimately recommend or render a decision. Consider an example where a decision-support system uses the belief network of FIG. 2 to troubleshoot automobile problems. If the engine for an automobile did not start, the decision-based system could request an observation of whether there was gas 224, whether the fuel pump 226 was in working order by possibly performing a test, whether the fuel line 228 was obstructed, whether the distributor 230 was working, and whether the spark plugs 232 were working. While the observations and tests are being performed, the belief network assists in determining which variable should be observed next.

SUMMARY OF THE INVENTION

In accordance with a first aspect of the present invention, a method is executed in a computer system capable of receiving expert data retrieved from an expert in a given field of expertise and empirical data reflecting observations made in the given field of the expert. In accordance with this method of the first aspect of the present invention, the preferred embodiment generates a belief network by receiving the expert data into the computer system, receiving the empirical data into the computer system, and creating a belief network utilizing the received expert data and the received empirical data.

DETAILED DESCRIPTION OF THE INVENTION

The preferred embodiment of the present invention provides for an improved system and method for generating belief networks. The belief network generator of the preferred embodiment creates an improved belief network through the utilization of both expert data received from an expert ("expert knowledge") and data received from real world instances of decisions made ("empirical data"). By utilizing both expert knowledge and empirical data, the preferred embodiment generates an improved belief network that is more accurate than conventional belief networks. In addition, the preferred embodiment facilitates the use of continuous variables in belief networks and handles missing data in the empirical data that is used to construct belief networks.

Expert knowledge consists of three components: a prior belief network ("prior network"), an equivalent sample size ("sample size"), and the prior probabilities of all possible belief-network structures ("priors on structures"). The prior network is obtained in the same fashion as in the conventional knowledge-based approach for constructing a belief network with the exception that the expert is asked to assume that all dependencies among variables are possible. That is, the expert assumes that an arc can be placed between all pairs of nodes. The effective sample size is the number of times that the expert has rendered a specific decision. For example, a doctor with 20 years of experience diagnosing a specific illness may have a sample size in the hundreds. The priors on structures refers to the confidence of the expert that there is a relationship between variables (e.g., the expert is 70 percent sure that two variables are related). The priors on structures can be decomposed for each variable-parent pair known as the "prior probability" of the variable-parent pair.

Empirical data is typically stored in a database. An example of acquiring empirical data can be given relative to the belief network of FIG. 2. If, at a service station, a log is maintained for all automobiles brought in for repair, the log constitutes empirical data. The log entry for each automobile may contain a list of the observed state of some or all of the variables in the belief network. Each log entry constitutes a case. When one or more variables are unobserved in a case, the case containing the unobserved variable is said to have "missing data." Thus, missing data refers to when there are cases in the empirical data database that contain no observed value for one or more of the variables in the domain. An assignment of one state to each variable in a set of variables is called an "instance" of that set of variables. Thus, a "case" is an instance of the domain. The "database" is the collection of all cases.

Figure 1:
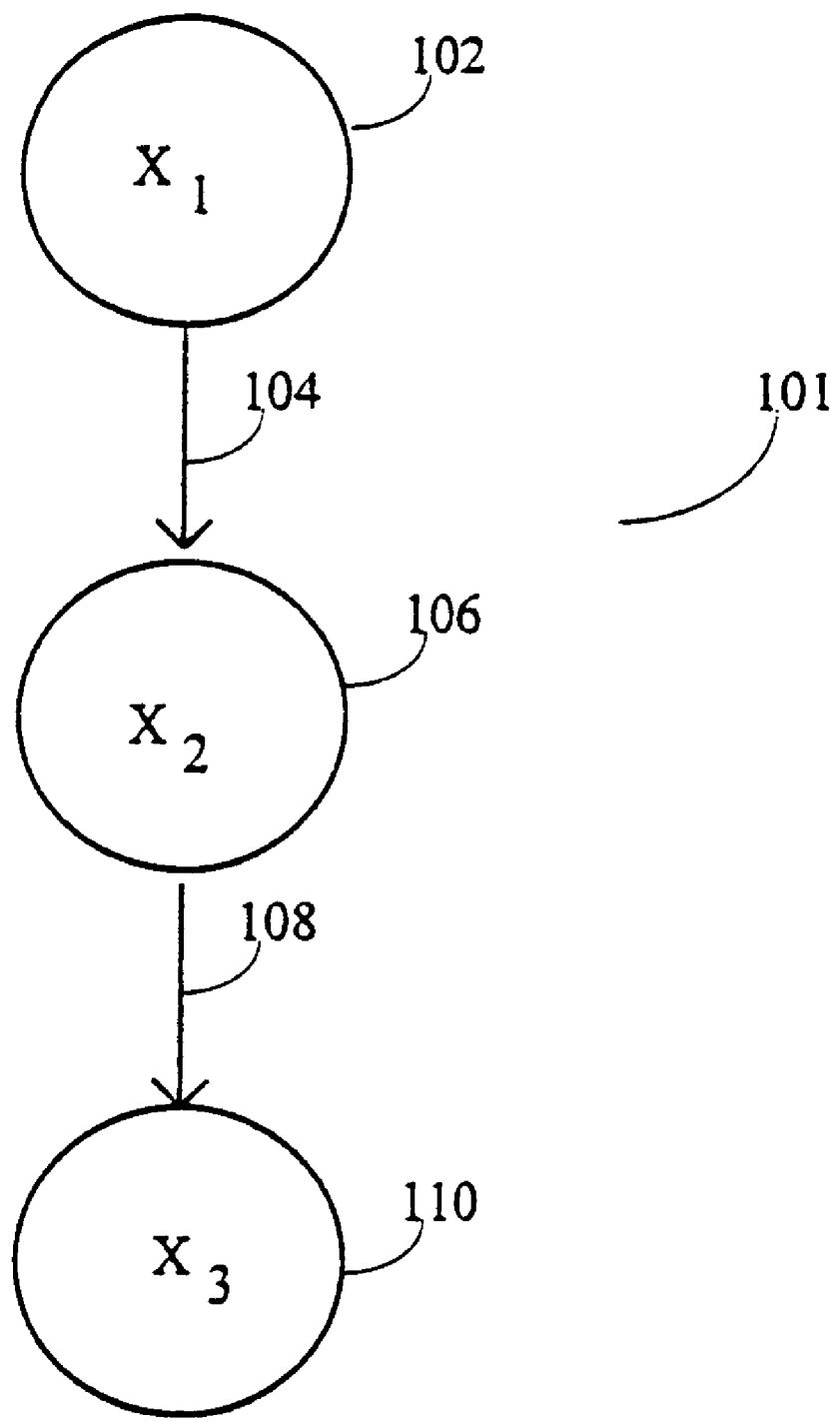
FIG. 1 depicts an example of a conventional belief network.
Figure 2:
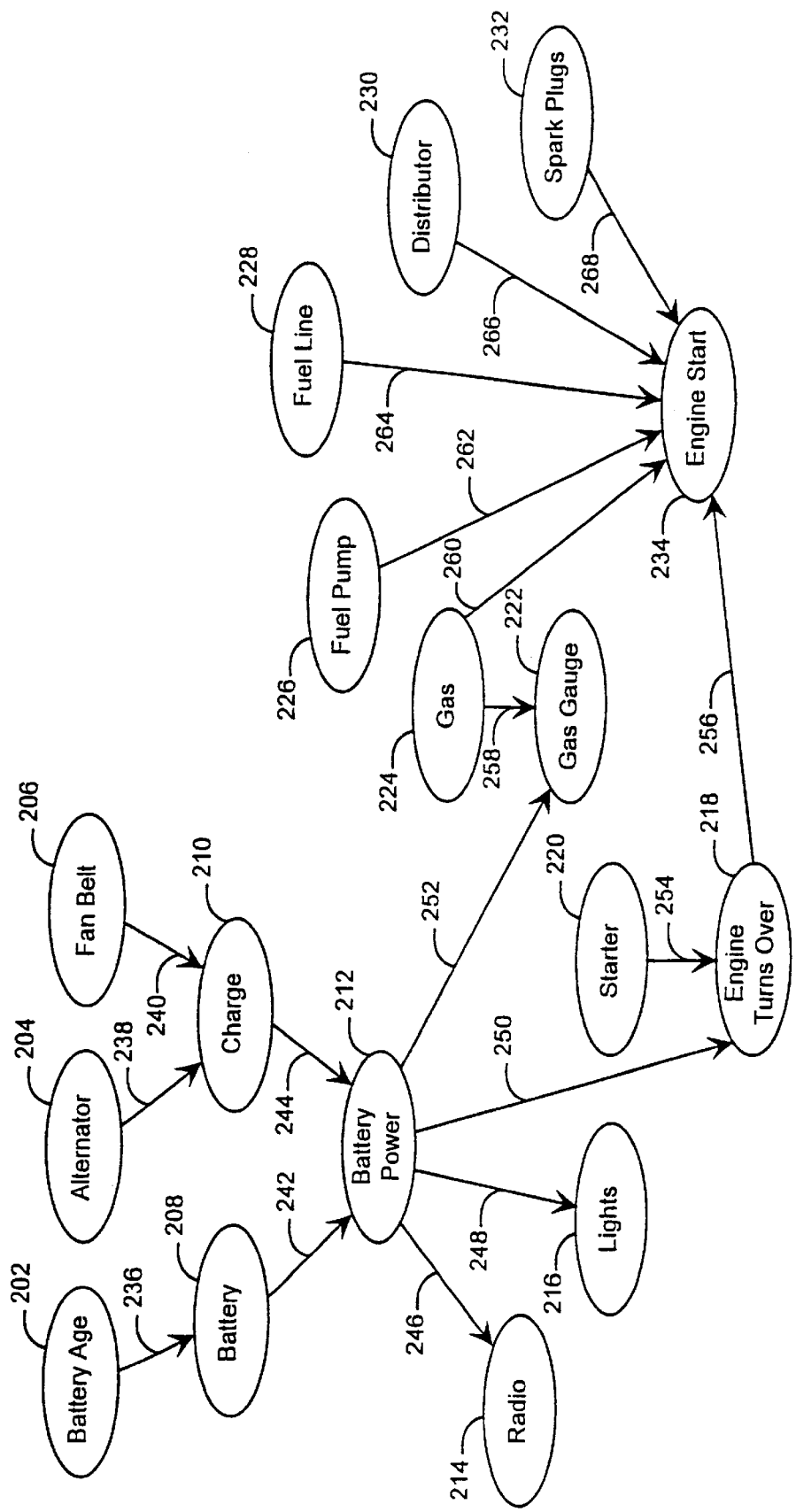
FIG. 2 depicts an example conventional belief network for troubleshooting automobile problems.

An example of a case can more clearly be described relative to the belief network of FIG. 2. A case may consist of the battery age 202 being 2.132 years old, the battery working properly 208 being true, the alternator working properly 204 being true, the fan belt being intact 206 being true, the charge 210 being sufficient, the battery power 212 being sufficient, the starter working properly 220 being true, the engine turning over 218 being true, the amount of gas 224 being equal to 5.3 gallons, the fuel pump working properly 226 being true, the fuel line working properly 228 being true, the distributor working properly 230 being false, the spark plugs working properly 232 being true and the engine starting 234 being false. In addition, the variables for the gas gauge 222, the radio working properly 214 and the lights working properly 216 may be unobserved. Thus, the above-described case contains missing data.

Figure 3:
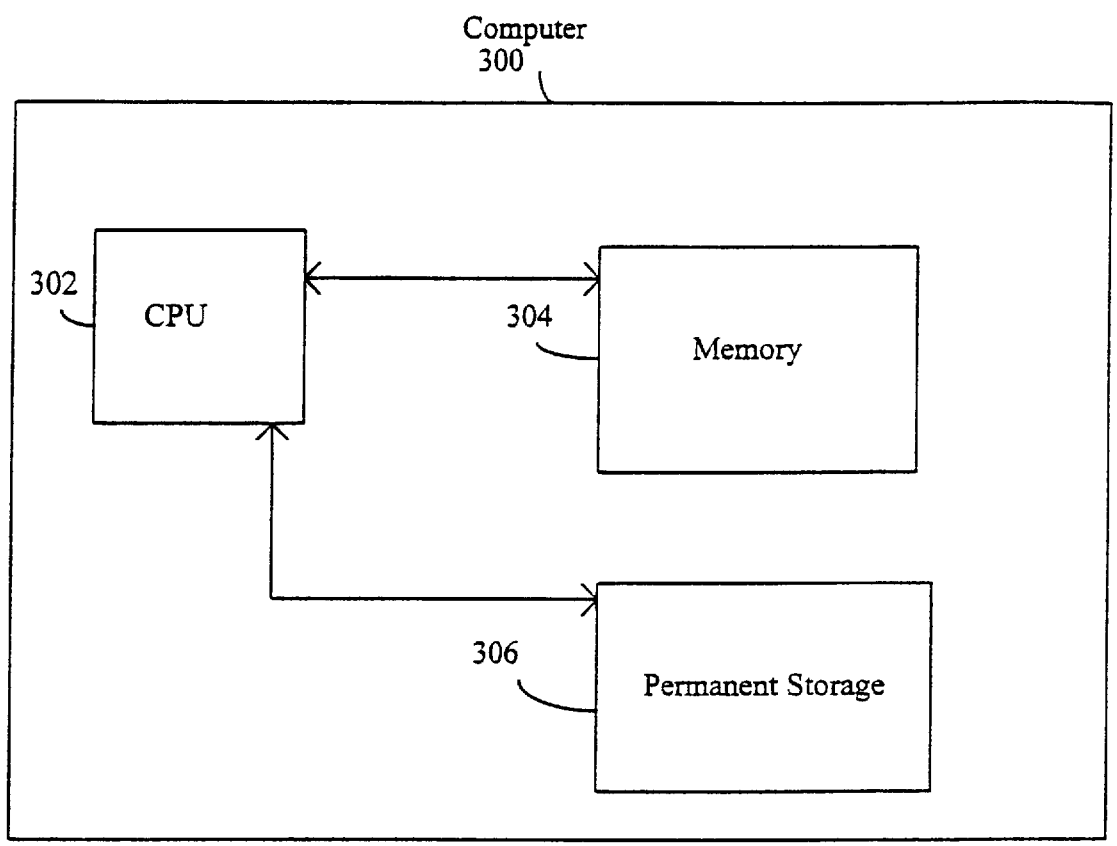
FIG. 3 depicts a computer system suitable for practicing the preferred embodiment of the present invention.

FIG. 3 depicts a computer system suitable for practicing the preferred embodiment of the present invention. The computer 300 contains a central processing unit (CPU) 302, a memory 304, and a permanent storage device 306. The CPU 302 is responsible for accessing data and computer programs on the permanent storage device 306. In addition, the CPU 302 is responsible for transferring computer programs into the memory 304 and executing the computer programs once resident in the memory. One skilled in the art will appreciate that a computer suitable for practicing the preferred embodiment of the present invention can contain additional or different components.

Figure 4:
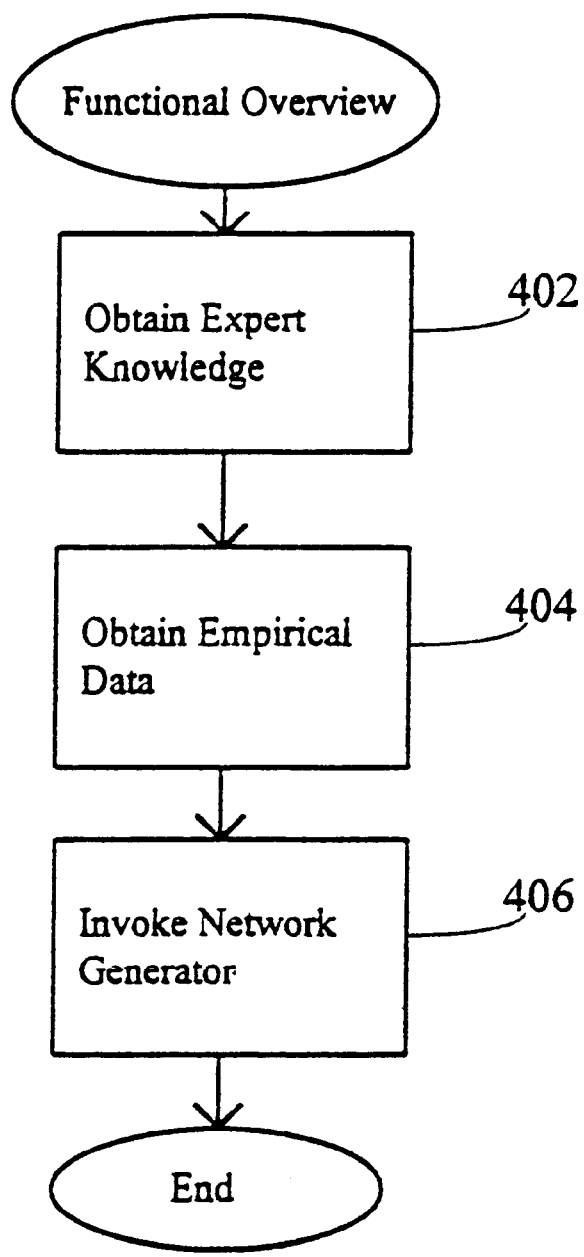
FIG. 4 depicts a functional overview of the belief network generator of the preferred embodiment.

FIG. 4 depicts a functional overview of the belief network generator of the preferred embodiment. In order to use the belief network generator of the preferred embodiment, a knowledge engineer first obtains expert knowledge from an expert in a given field (step 402). Although, as part of the expert knowledge, a prior network is typically used containing variables, arcs and probabilities, the preferred embodiment has a facility, described below, for accepting a prior network with only the variables being specified. The knowledge engineer then obtains empirical data from real world invocations of decision making in the given field (step 404). After obtaining the expert knowledge and the empirical data, the knowledge engineer invokes the network generator of the preferred embodiment to create an improved belief network that can then be used as the basis for a decision-support system (step 406). Although step 402 has been described as occurring before step 404, one skilled in the art will appreciate that step 404 may occur before step 402.

Figure 5:
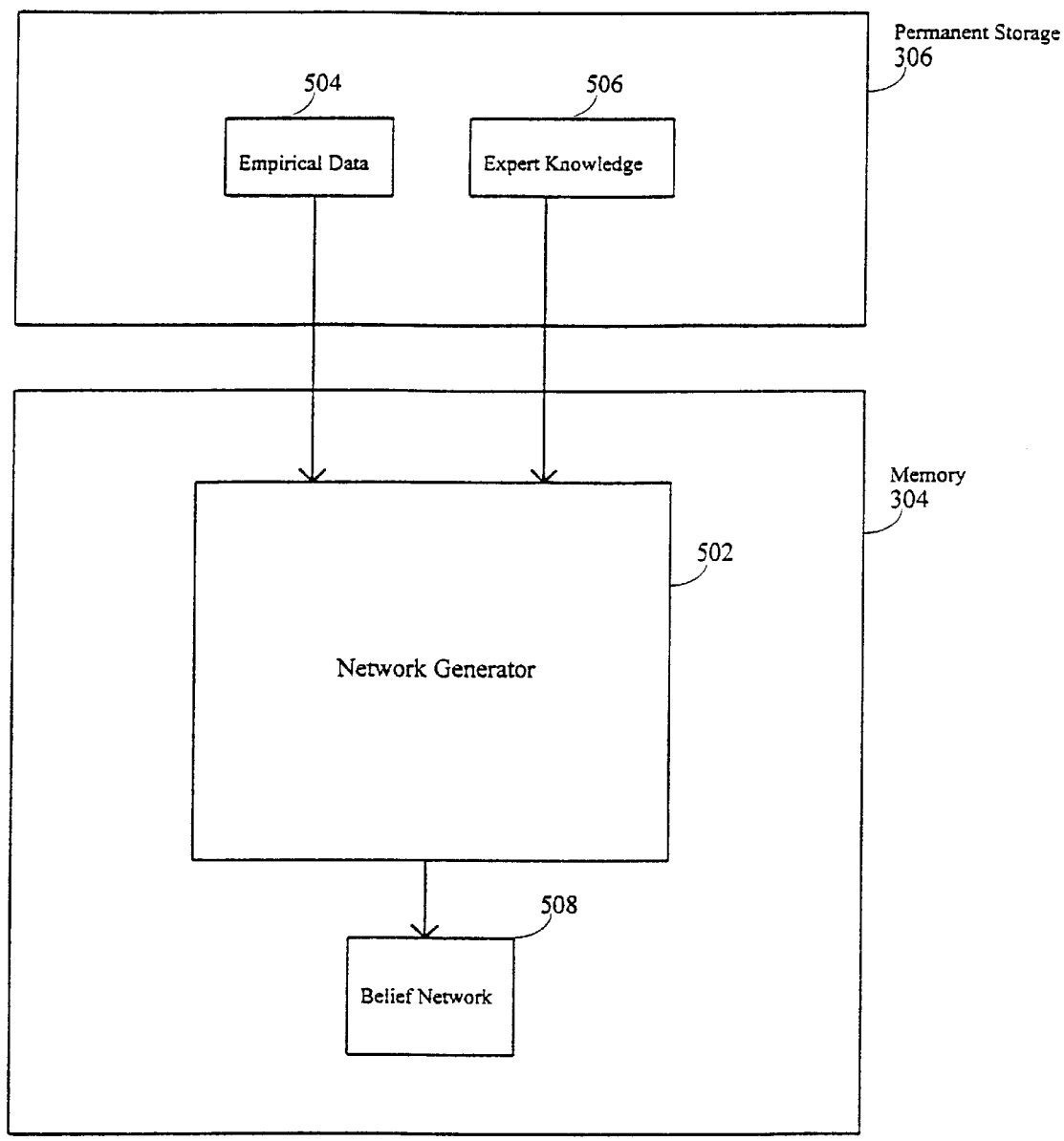
FIG. 5 depicts the belief network generator of the preferred embodiment in a computer system suitable for practicing the preferred embodiment of the present invention.

FIG. 5 depicts the network generator of the preferred embodiment in a computer system suitable for practicing the preferred embodiment of the present invention. The network generator of the preferred embodiment 502 resides within memory 304 and receives empirical data 504 and expert knowledge 506 as input. The expert knowledge 506, as previously described, typically comprises a prior network with nodes, arcs and probabilities, a sample size, and the priors on structures. Both the empirical data 504 and the expert knowledge 506 reside in the permanent storage device 306. The empirical data 504 is typically comprised of cases stored in a database ("the empirical data database"). In response to receiving both the empirical data 504 and the expert knowledge 506, the network generator 502 of the preferred embodiment generates an improved belief network 508.

Figure 6:
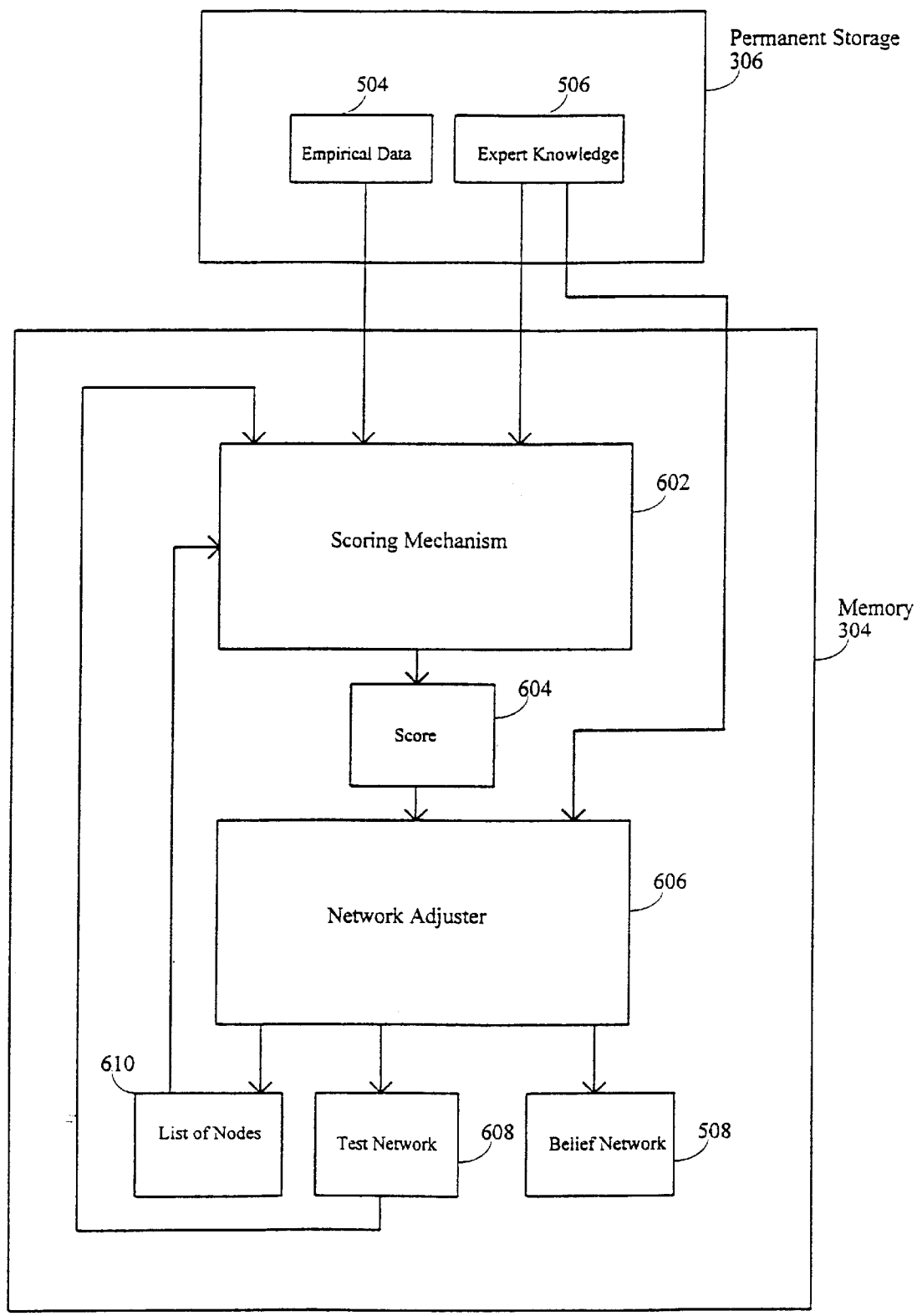
FIG. 6 depicts a more detailed diagram of the belief network generator of FIG. 5.

FIG. 6 depicts a more detailed diagram of the network generator 502 of the preferred embodiment. The network generator 502 of the preferred embodiment contains a scoring mechanism 602 and a network adjuster 606. The scoring mechanism 602 receives the expert knowledge 506, the empirical data 504, the test network 608 and a list of nodes 610 as input. After receiving this information, the scoring mechanism 608 generates a score 604 that ranks the nodes of test network 608 as indicated by the list of nodes 610 for goodness. Thus, the score 604 contains a subscore for each node scored. Each subscore indicates how well the portion of the test network involving the node corresponding to the subscore and the parents of the node is at rendering inferences based on the empirical data 504 and the expert knowledge 506. The test network 608 received as input is either the prior network or a test network 608 generated by the network adjuster 606 depending on the circumstances. That is, the scoring mechanism 602 of the preferred embodiment uses the prior network 506 as the test network for the first invocation of the scoring mechanism. After the first invocation of the scoring mechanism 602, the test network received by the scoring mechanism is the test network 608 generated by the network adjuster. In the preferred embodiment, a belief network (i.e., the prior network 506 or the test network 608) is stored in memory as a tree data structure where each node in the tree data structure corresponds to a node in the belief network. The arcs of the belief network are implemented as pointers from one node in the tree data structure to another node. In addition, the probabilities for each node in the belief network are stored in the corresponding node in the tree data structure.

The network adjuster 606 receives as input the score 604 and the prior network 506 and generates a new test network 608 in response thereto, which is then passed back to the scoring mechanism 602 with a list of nodes 610 which need to be rescored. After iterating many times between the scoring mechanism 602 and the network adjuster 606, the network adjuster eventually generates an improved belief network 508. The network adjuster 606 generates the improved belief network 508 when the scores 604 generated do not improve. That is, the network adjuster 606 retains the test network 608 that the network adjuster last generated, modifies the test network based on the score 604, and if the network adjuster cannot generate a test network with a better score than the retained test network, the network adjuster generates the retained test network as the improved belief network 508. Although the preferred embodiment has been described as iterating many times between the scoring mechanism 602 and the network adjuster 606, one skilled in the art will appreciate that only one iteration may be performed. The prior network used by the scoring mechanism 602 of the preferred embodiment can consist of all discrete variables, all continuous variables, or a combination of discrete and continuous variables. The empirical data 504 used by the scoring mechanism 602 of the preferred embodiment may have cases containing missing data.

Figure 7:
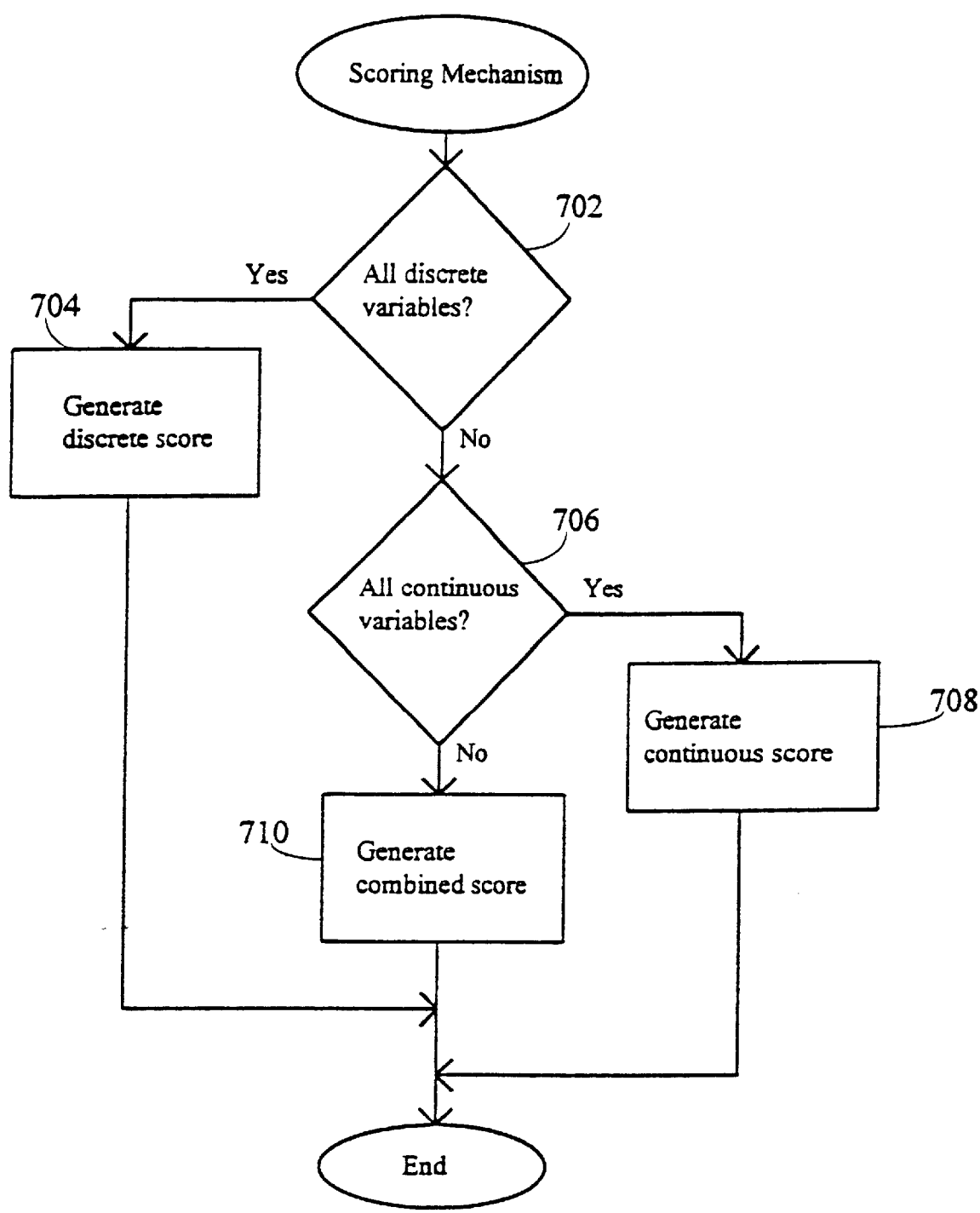
FIG. 7 depicts a high-level flow chart of the steps performed by the scoring mechanism of the preferred embodiment.

FIG. 7 depicts a high level flow chart of the steps performed by the scoring mechanism 602 of the preferred embodiment. The scoring mechanism 602 of the preferred embodiment determines the types of variables used in the test network 608 and generates a score for the test network. First, the scoring mechanism of the preferred embodiment determines if the test network 608 contains all discrete variables (step 702). If the test network 608 contains all discrete variables, the scoring mechanism 602 generates a score for the nodes in the list of nodes 610 of the test network by invoking the calculate discrete score routine (step 704). However, if the test network 608 does not contain all discrete variables, the scoring mechanism 602 determines if the test network contains all continuous variables (step 706). If the test network 608 contains all continuous variables, the scoring mechanism 602 generates a score for the nodes indicated in the list of nodes 610 of the test network by invoking the calculate continuous score routine (step 708). However, if the test network 608 does not contain all continuous variables, the test network contains a combination of discrete and continuous variables ("a mixed network"), and the scoring mechanism generates a score for the nodes indicated by the list of nodes 610 of the test network by invoking the calculate mixed score routine (step 710).

The calculate discrete score routine, the calculate continuous score routine and the calculate mixed score routine are based upon a common concept, Bayes' theorem. The score that each scoring routine produces is proportional to the posterior probability of the test network. That is, probability distributions and densities can be of two types: prior and posterior. The prior probability distribution or density is the probability distribution or density before data is observed. The posterior probability distribution or density is the probability distribution or density after data is observed. Bayes' theorem states that the posterior probability of a test network is proportional to the prior probability of a test network multiplied by the probability of the empirical data database given the test network and the expert knowledge.

The calculate discrete score routine of the preferred embodiment scores a test network containing all discrete variables. The calculate discrete score routine takes advantage of the fact that the probability of the empirical data database given a test network and expert knowledge is the product over all cases of the probability of a particular case given a test network, expert knowledge, and previously observed cases to the particular case. The computation of the probability of a case given a test network, expert knowledge, and previous cases is based on the assumption that the empirical data database represents a multinomial sample from the test network. That is, the empirical data database contains a sequence of observations that form a multinomial distribution as described in DeGroot, *Optimal Statistical Decisions*, at 48–49 (1970). Thus, each variable given each instance of the parents of the variable is associated with a set of parameters $\{\theta_{ij1}, \ldots, \theta_{ijr_i}\}$. Where i is the variable index; "i=1 . . . n," where "n" is the number of variables in the test network. Where j is the parent-instance index; "j=1 . . . $q_i$," where $q_i$ is the number of instances of the parents. Where k is the variable state index; "k=1 . . . $r_i$," where "$r_i$" is the number of states of variable i. The parameter $\theta_{ijk}$ is the long run fraction for $x_i$=k, when $\Pi_i$=j. That is, for all values of i, j, and k, $p(x_i=k|\Pi_i=j, \theta_{ijk}, B_s^e, \xi) = \theta_{ijk}$, where $B_s^e$ is the test network. In addition, the calculate discrete score routine is based on the assumption that the parameter sets $\{\theta_{ij1}, \ldots, \theta_{ijr_i}\}$ are independent and if $x_i$ has the same parents in two different belief networks, then the prior densities of $\{\theta_{ij1}, \ldots, \theta_{ijr_i}\}$ for j=1 . . . $q_i$ are the same for both belief networks. Thus, the probability of the database given a test network and expert knowledge is the product of the means of the density of the long-run fractions for a particular case:

$$\prod_{i=1}^{n_i} \prod_{j=1}^{q_i} \prod_{k=1}^{r_i} \prod_{l=1}^{m} \langle \theta_{ijk} | C_1, \ldots, C_{l-1}, B_s^e, \xi \rangle^{\alpha_{lijk}}$$

Where $\alpha_{lijk}$=1 if $x_i$=k and $\Pi_i$=j in the lth case 0 otherwise

Where < > denotes the average with respect to the parameters $\{\theta_{ij1}, \ldots, \theta_{ijr_i}\}$.

Where C is a case in the empirical database.

Where $B_s^e$ is the event indicated by the test network.

In addition, the preferred embodiment assumes that the density of each parameter set $\{\theta_{ij1}, \ldots, \theta_{ijr_i}\}$ has a Dirichlet distribution as defined by:

$$\rho(\theta_{ijl}, \ldots, \theta_{ijr_i} | B_S^e, \xi) = \frac{\Gamma\left(\sum_{k=1}^{r_i}(e_k+1)\right)}{\prod_{k=1}^{r_i} \Gamma(e_k+1)} \prod_{k=1}^{r_i} \theta_{ijk}^{e_k}, \quad e_k > -1$$

where "$\Gamma(\ )$" is the Gamma function defined as $\Gamma(x)=\int_0^\infty e^{-y} y^x dy$. The exponents are determined from the prior network and the sample size K:

$$e_k = Kp(x_i=k, \Pi_i=j|B_{sc}^e)$$

where $B_{sc}^e$ is the event corresponding to the prior network and represents the assertion that all dependencies among the variables are possible.

Therefore, the preferred embodiment renders a subscore for a variable $x_i$ in the test network by calculating $$\prod_{j=1}^{q_i} \prod_{k=1}^{r_i} \prod_{l=1}^{m} \langle \theta_{ijk} | C_1, \ldots, C_{l-1}, B_s^e, \xi \rangle^{\alpha_{lijk}}$$

The mean of a Dirichlet distribution for a variable is readily computed. Furthermore, given the observation of complete cases, the density for each parameter set $\{\theta_{ij1}, \ldots, \theta_{ijr_i}\}$ remains a Dirichlet distribution ("Dirichlet") after the observation of complete cases. Since the density for each parameter set remains Dirichlet, the Dirichlet distribution is said to be conjugate for multinomial sampling. In the event that the database contains missing data, the densities of some long-run fractions do not have a Dirichlet distribution, and therefore, the calculate discrete score routine approximates the distributions to be Dirichlet, determines the means, and multiplies the means together as in the situation for complete cases. The calculate discrete score routine determines that there is missing data in a case by determining that a variable in the case has not been observed.

Figure 8A:
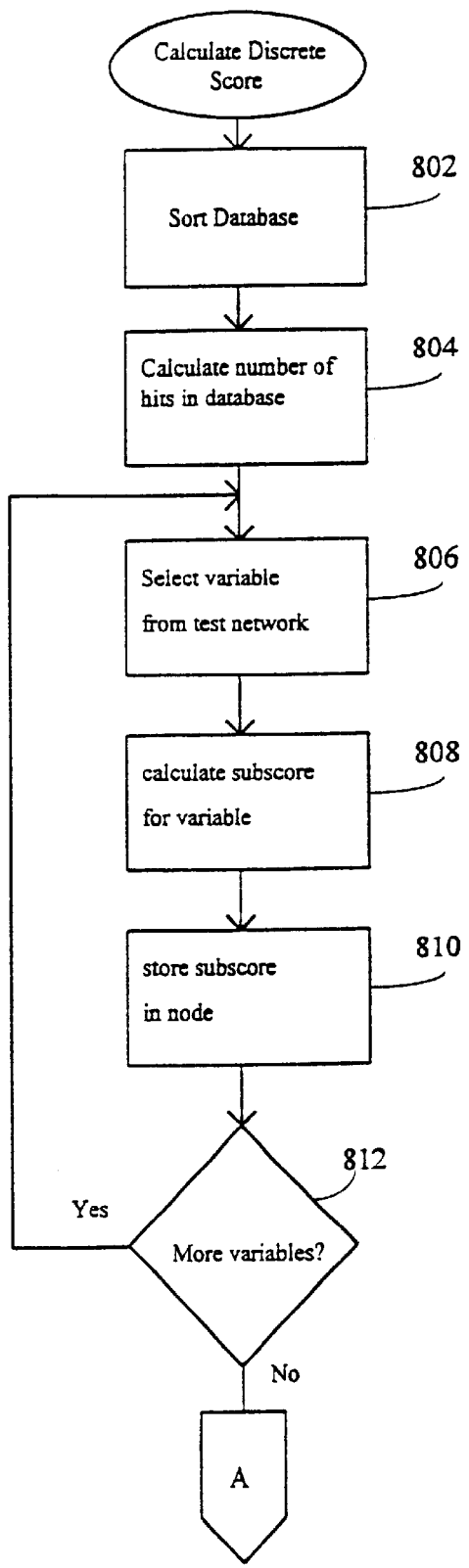
FIGS. 8A and 8B depict a flow chart of the steps performed by the calculate discrete score routine of the preferred embodiment.
Figure 8B:
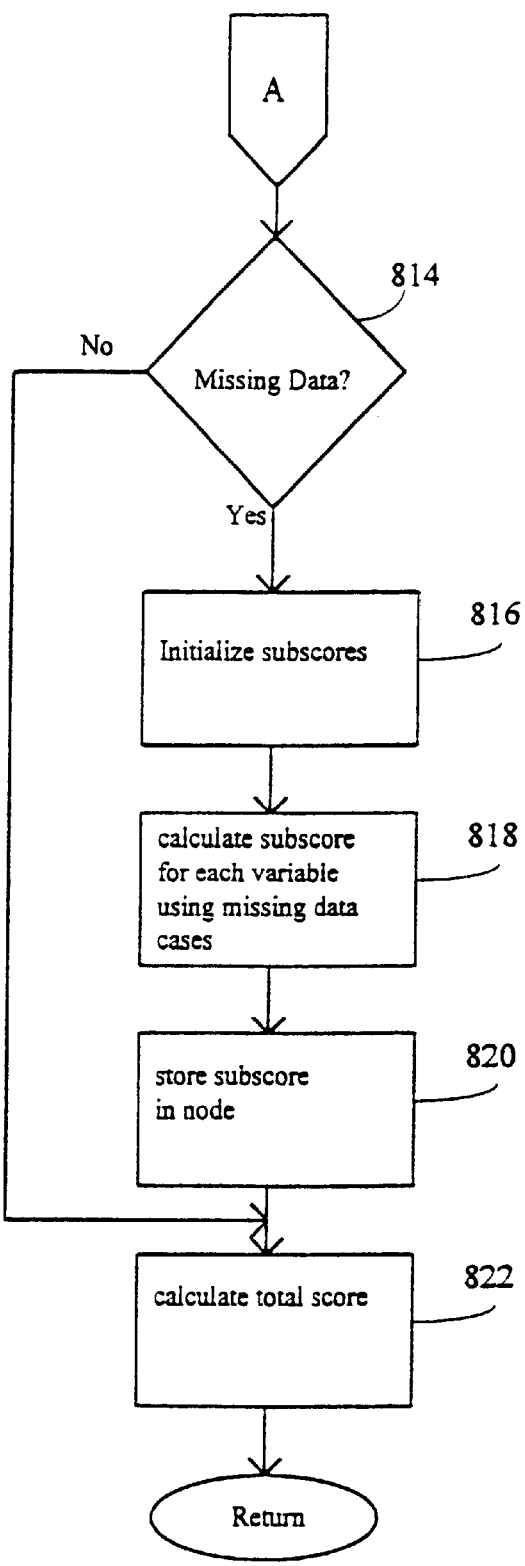

FIGS. 8A and 8B depict a flow chart of the steps performed by the calculate discrete score routine of the preferred embodiment. The first step of the calculate discrete score routine is sorting the empirical data database 504 so that all cases of complete data appear first in the empirical data database and all cases containing missing data appear last (step 802). The next step performed by the calculate discrete score routine is to calculate the number of hits in the complete portion of the empirical data database 504 (step 804). The calculate discrete score routine scans the empirical data database and calculates the number of times ("hits") that each variable is encountered, for each state of each variable, and for each possible instance of the parents of each variable. The number of hits, therefore, has three indices i, j and k; "i=1 . . . n," where "n" is the number of variables in the test network; "j=1 ... $q_i$", where $q_i$ is the number of instances of the parents; and "k=1 ... $r_i$", where "$r_i$" is the number of states of variable i. The number of hits ("$N_{ijk}$") is entered into a three-dimensional array, and for every instance of i, j, and k, the current value in the array is incremented. One skilled in the art will appreciate that the number of hits is a sufficient statistic for multinomial sampling. Next, the calculate discrete score routine of the preferred embodiment selects a variable from the test network 608 according to the list of nodes 610 to score, starting with the first variable in the list of nodes (step 806). After a variable is selected, the calculate discrete score routine calculates a subscore for the selected variable (step 808) and stores the calculated subscore in the node of the test network that corresponds with the selected variable (step 810). The subscore for each variable $x_i$ is calculated using the following formula:

$$p(B_s^e(i)|\xi).$$

$$\prod_{i=1}^{n} \prod_{j=1}^{q_i} \frac{\Gamma(Kp(\Pi_i = j \mid B_{sc}^e, \xi))}{\Gamma(N_{ij} + Kp(\Pi_i = j \mid B_{sc}^e, \xi))}$$

$$\prod_{k=1}^{r_i} \frac{\Gamma(N_{ijk} + Kp(x_i = k, \Pi_i = j \mid B_{sc}^e, \xi))}{\Gamma(Kp(x_i = k, \Pi_i = j \mid B_{sc}^e, \xi))}$$

The term "$p(B_s^e(i)|\xi)$" refers to the prior probability of the variable-parent pair $x_i-\Pi_i$.

The probability calculations for the above formula "p( )" is performed using the Jensen algorithm as described in Jensen, Lauritzen, and Olesen, *Bayesian Updating in Recursive Graphical Models by Local Computations*, Technical Report R-89-15, Institute of Electronic Systems, Aalborg University, Denmark. The term $$\prod_{i=1}^{n} \prod_{j=1}^{q_i} \frac{\Gamma(Kp(\Pi_i = j \mid B_{sc}^e, \xi))}{\Gamma(N_{ij} + Kp(\Pi_i = j \mid B_{sc}^e, \xi))}$$

is the product for all variables "$X_i$" and for all states "j" of the parents of that variable. The numerator is the gamma function "Γ" of the sample size K times the probability of the parents of variable $X_i$ equaling j given the event indicated by the prior network $B_{sc}^e$ and the expert knowledge "ξ". The denominator of this term is the gamma function of $N_{ij}=\Sigma_{k=1}^{r_i} N_{ijk}$ plus the sample size "K" times the probability of the parents of variable "$X_i$" equaling "j" given the event indicated by the prior network "$B_{sc}^e$" and the expert knowledge. The term $$\prod_{k=1}^{r_i} \frac{\Gamma(N_{ijk} + Kp(x_i = k, \Pi_i = j \mid B_{sc}^e, \xi))}{\Gamma(Kp(x_i = k, \Pi_i = j \mid B_{sc}^e, \xi))}$$

is the product for all states "k" of variable "$X_i$", where the numerator is the gamma function of the number of hits plus the sample size times the probability of the variable "$X_i$" equaling state "k" and the parents of "$X_i$" equaling state "j" given the event indicated by the prior network "$B_{sc}^e$" and the expert knowledge. The denominator of the term is the gamma function of the sample size times the probability of the variable $X_i$ equaling state k and the parents of $x_i$ equaling state j given the event indicated by the prior network $B_{sc}^e$ and the expert knowledge.

After the subscore for a variable is calculated and stored, the calculate discrete score routine determines if there are more variables to be processed and either continues to step 806 to process more variables, or continues to step 814 in FIG. 8B (step 812). If there are no more variables for processing, the calculate discrete score routine determines if there is missing data in any of the cases in the empirical data database (step 814). If missing data is found, the calculate discrete score routine continues to step 816, wherein the subscore for each node is initialized to the log of the current subscore stored within the node. The preferred embodiment uses the log of the subscore in order to simplify calculations. The subscore initialization algorithm follows:

$$\text{score}[i] = \text{Log}(\text{Subscore } x_i)$$

After the initialization is performed, the calculate discrete score routine calculates a subscore for each variable using the cases in the empirical data database containing missing data (step 818) and stores the subscore for each variable in the node corresponding to the variable (step 820). After storing the subscores, a total score for the test network is generated by multiplying all of the subscores together (step 822). The formula for calculating the subscore for cases where there is missing data follows:

$$p(B_s^e(i) \mid \xi) \cdot \prod_{i=1}^{n_j} \prod_{j=1}^{q_i} \prod_{k=1}^{r_i} \prod_{l=1}^{v_i} \langle \theta_{ijk} \mid C_1, \ldots, C_{l-1}, B_s^e, \xi \rangle^{\alpha_{lijk}}$$

Where "$p(B_s^e(i)|\xi)$" refers to the prior probability that $x_i$ has parents $\Pi_i$ as indicated by the priors on structures.

Where $\theta_{ijk}$ is the long run fraction for $x_i=k$ when $\Pi_i=j$.

Where α1ijk=1 if $x_i=k$ and $\Pi_i=j$ in the lth case 0 otherwise

Where < > denotes the average with respect to the densities $\{\theta_{ij1}, \ldots, \theta_{ijr_i}\}$.

Where C is a case in the empirical database.

Where $B_s^e$ is the event indicated by the test network.

As previously described, the calculate discrete score routine approximates the density for each parameter set $\{\theta_{ij1}, \ldots, \theta_{ijr_i}\}$ to be a Dirichlet distribution when there is missing data. One embodiment utilizes an approximation based on Spiegelhalter and Lauritzen in Sequential Updating of Conditional Probabilities on Directed Graphical Structures, *Networks*, 20:579–605 (1990). In this embodiment, the algorithm used for creating subscores and storing the subscores is depicted in Code Table Number One.

| Variables | Meaning |
|---|---|
| $N1_{ijk}$ | $N_{ijk} + 1$ |
| $m_{ijk}$ | $p(x_i = k \mid \Pi_i = j, B_s^e, \xi)$ |
| score [1 ... n] | Subscore for each node |
| $p_j, p_{jo}, p_{jk}$ | temporary variables |
| $V_s, V_k$ | temporary variables |

| Function | Meaning |
|---|---|
| δ | 1 if $s = k$ |
|  | 0 if $s \neq k$ |

\*initialize: only initialize a term if it is accessed in lines 8–37*\
2 for i=1 ... n, j=1 ... $q_i$ do
3 for k=1 ... $r_i$ 4 $N1_{ijk}{:}N=K{\cdot}p(x_i=k,\Pi_i=j|B_{sc}^{e},\xi)+N_{ijk}$ $$NI_{ij} := \sum_{k=1}^{r_i} NI_{ijk}$$

6 for k=1 . . . $r_i$
7 $m_{ijk}{:}=N1_{ijk}/N1_{ij}$
\*score*\
8 for each case $C_l1=1$ . . . m
9 for each i=1 . . . n
10 if $x_i$ observed (in state-say-k)
11 if each variable in $\Pi_i$ observed (in state-say-j)
12 score[i]:=score[i]+log ($m_{ijk}$)
13 $N1_{ijk}{:}=N1_{ijk}+1$
14 N1ij:=N1ij+1
15 $m_{ijk}{:}=N1_{ijk}/N1_{ij}$
16 else
17 score[i]:=score[i]+log[p($x_i$=k|$x_1$, . . . $x_{i-1}$,$B_s^e$,$\xi$)]
18 for j=1 . . . $q_i$
19 $p_j{:}=p(\Pi=j|C_l,B_s^e,\xi)$ 20 for s=1 . . . $r_i$ $$m_{ijs} := \frac{NI_{ijk}+1}{NI_{ij}+1} p_j \delta(s=k) + m_{ijk}(1-p_j)$$

22 for s=1 . . . $r_i$ $$V_s := \left[ \frac{(NI_{ijk}+1)(NI_{ij}-NI_{ijk})}{(NI_{ij}+1)^2(NI_{ij}+2)} + \left(\frac{NI_{ijk}+1}{NI_{ij}+1} - m_{ijs}\right)^2 \right](p_j)$$

$$\delta(s=k) + \left[ \frac{NI_{ijk}(NI_{ij}-NI_{ijk})}{NI_{ij}^2(NI_{ij}+1)} + \left(\frac{NI_{ijk}}{NI_{ij}} - m_{ijs}\right)^2 \right](1-p_j)$$

$$NI_{ij} := \left[ \frac{\sum_{s=1}^{r_i} m_{ijs}^2 (1-m_{ijs})}{\sum_{s=1}^{r_i} m_{ijs} v_s} \right] - 1$$

25 for s=1 . . . $r_i$
26 $N1_{ijs}{:}=m_{ijs}{\cdot}N1_{ij}$
27 else ($x_i$ not observed)
28 for j=1 . . . $q_i$
29 $p_{jo}=1-p(\Pi_i=j|C_l,B_s^e,\xi)$
30 for k:=1 . . . $r_i$
31 $P_{jk}{:}=p(x_i=k,\Pi=j|C_l,B_s^e,\xi)$
32 for k=1 . . . $r_i$ $$m_{ijk} := \left[ \sum_{s=1}^{r_i} \frac{NI_{ijs}+\delta(s=k)}{NI_{ij}+1} p_{js} + m_{ijk} \cdot p_{jo} \right]$$

34 for k=1 . . . $r_i$ $$v_k := \left[ \sum_{s=1}^{r_i} \left( \frac{(NI_{ijs}+\delta(s=k))(NI_{ij}+1-NI_{ijs}-\delta(s=k))}{(NI_{ij}+1)^2(NI_{ij}+2)} + \right. \right.$$

$$\left. \left( \frac{NI_{ijk}+\delta(s=k)}{NI_{ij}} - m_{ijs} \right)^2 \right) p_{js} +$$

$$\left. \left( \frac{NI_{ijk}(NI_{ij}-NI_{ijk})}{NI_{ij}^2(NI_{ij}+1)} + \left(\frac{NI_{ijk}}{NI_{ij}} - m_{ijk}\right)^2 \right) p_{jo} \right]$$

$$NI_{ij} := \left[ \frac{\sum_{k=1}^{r_i} m_{ijk}^2 (1-m_{ijk})}{\sum_{k=1}^{r_i} m_{ijk} V_k} \right] - 1$$

36 for k=1 . . . $r_i$
37 $N1_{jk}{:}=m_{ijk}{\cdot}N1_{ij}$

An alternative embodiment approximation algorithm is based on Titterington in Updating a Diagnostic System Using Unconfirmed Cases, *Applied Statistics*, 25:238–247, 1976. In this embodiment, lines 18–37 are replaced with:
18 for j=1 . . . $q_i$
19 for k=1 . . . $r_i$
20 $N1_{ijk}{:}=N1_{ijk}+p(x_i=k,\Pi_i=j|C_l,B_s^e,\xi)$ $$NI_{ij} = \sum_{k=1}^{r_i} NI_{ijk}$$

21 for k=1 . . . $r_i$ $$m_{ijk} := \frac{NI_{ijk}}{NI_{ij}}$$

The calculate continuous score routine calculates scores for test networks containing all continuous variables and is based on Bayes' theorem. The calculate continuous score routine assumes that all cases in the empirical data database are drawn from a multivariate normal distribution. The calculate continuous score routine also assumes that the prior network represents a multivariate normal distribution. The calculate continuous score routine takes advantage of the fact that a set of variables have a multivariate normal distribution if and only if each particular variable is an independent (univariate) normal distribution, when conditioned on the variables that precede the particular variable in some ordering:

$$\rho(x_i | x_1 \ldots x_{i-1}) = n\left(m_i + \sum_{j=1}^{i-1} b_{ij}(x_j - m_j), 1/v_i\right)$$

The term $p(x_i|x_1 \ldots x_{i-1})$ denotes the density of a particular variable given all the before the particular variable in some ordering. The term $$n\left(m_i + \sum_{j=1}^{i-1} b_{ij}(x_j - m_j), 1/v_i\right)$$

contains "n" referring to a normal distribution having a mean "$m_i$", a variance "$v_i$" and coefficients "$b_{ij}$". "m", "v" and "b" are parameters of the normal distribution. The coefficient "$b_{ij}$" refers to the strength of the connection between the mean of a variable "$X_i$" and the value of the variables "$X_j$". Thus, $b_{ij}$ is equal to zero if and only if there is no arc from "$X_j$" to "$X_i$" in the test network. One skilled in the art would recognize that the coefficient "$b_{ij}$" is sometimes called a partial regression coefficient between "$x_i$" and "$x_j$". The multivariate normal distribution and the univariate normal distribution are well known in the field of statistics.

In addition, the calculate continuous score routine is based on three assumptions. First, the calculate continuous score routine assumes that the prior distributions for the mean and precision matrix of the multivariate normal distribution with all dependencies between variables being possible (i.e., $B_{sc}^e$) is the normal-Wishart distribution. The normal-Wishart distribution is described in DeGroot, *Optimal Statistical Decisions*, at 56–59 (1970). The normal-Wishart distribution is conjugate for multivariate normal sampling. Second, for each variable, the "v" and "b" parameters are independent. Third, if $x_i$ has the same parents in two different belief networks, then the prior densities of "v" and "b" of $X_i$ for both belief networks are the same.

Figure 9A:
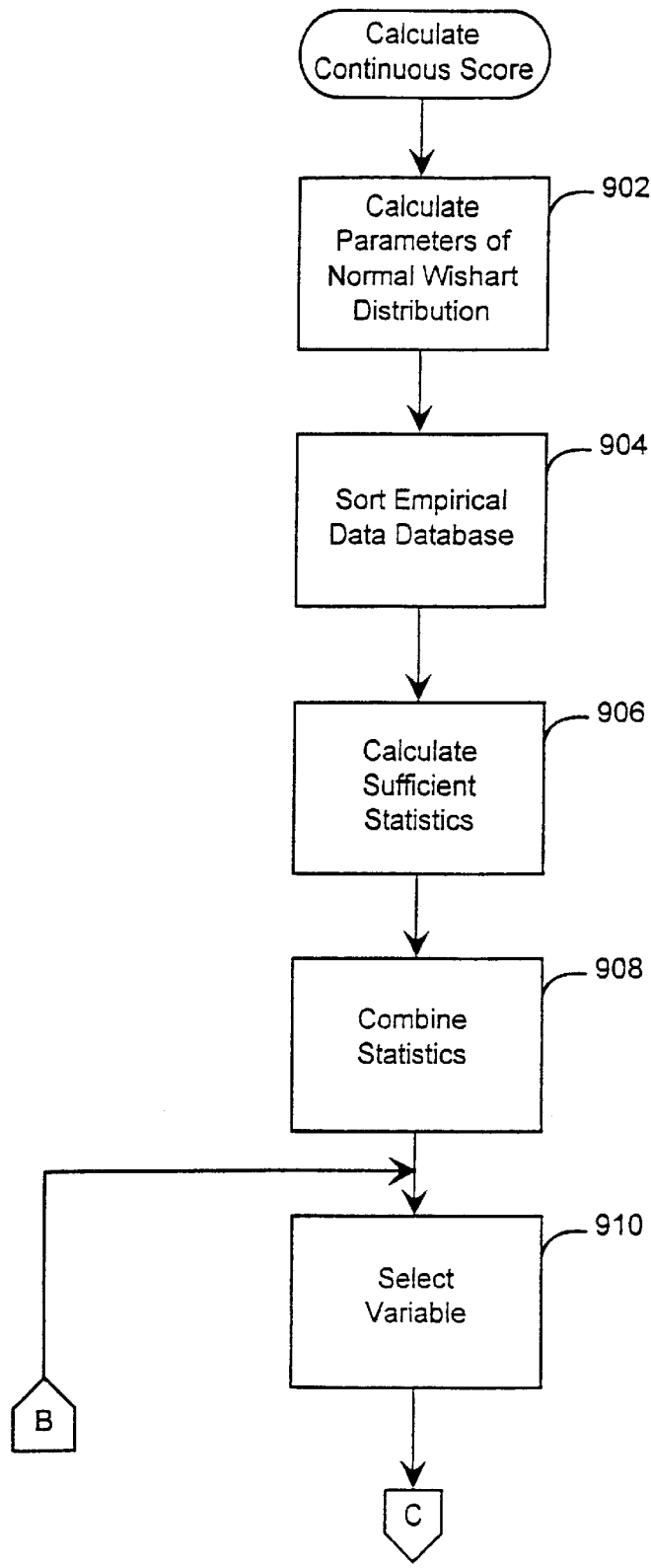
FIGS. 9A and 9B depict a flow chart of the steps performed by the calculate continuous score routine of the preferred embodiment.
Figure 9B:
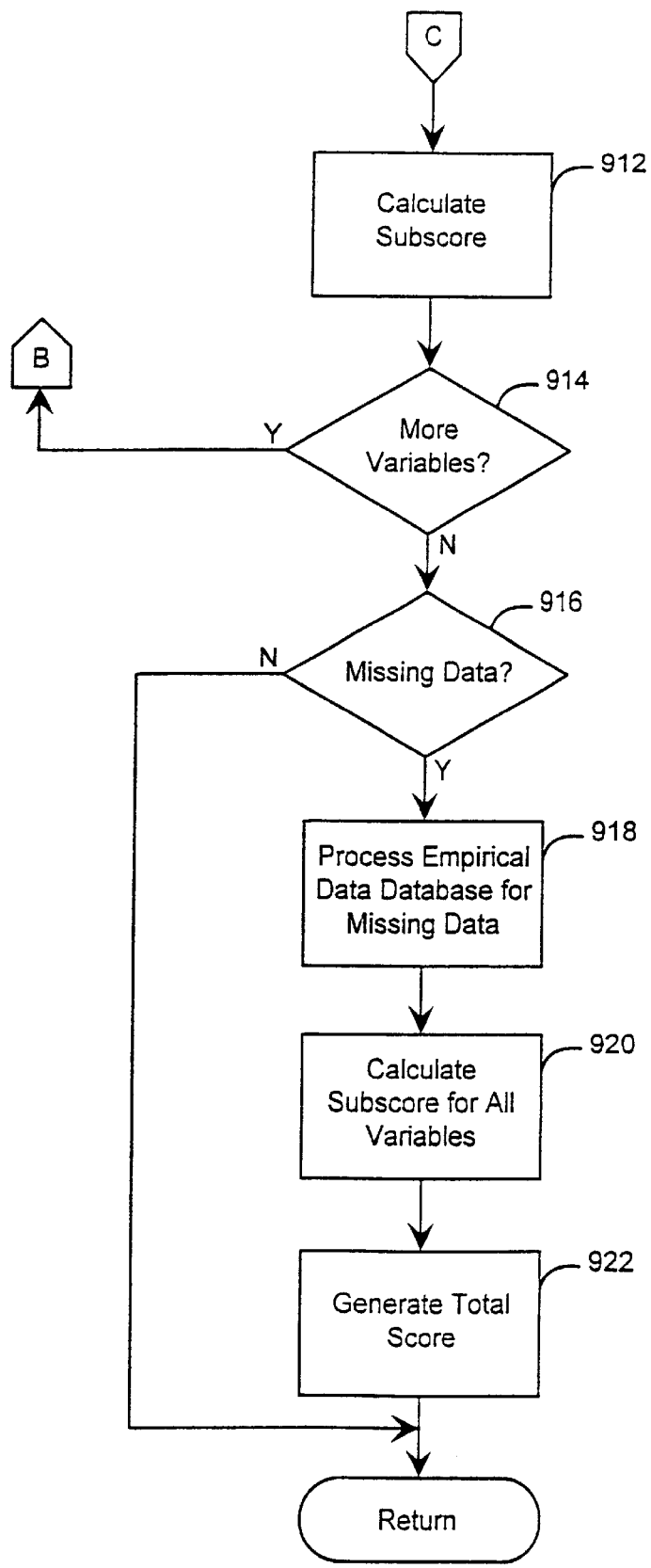

FIGS. 9A and 9B depict a flow chart of the steps performed by the calculate continuous score routine of the preferred embodiment. The calculate continuous score routine of the preferred embodiment first calculates the parameters associated with the prior densities of the normal-Wishart distribution from the prior network and the sample size "K" (step 902):

$$T_0 = cov(\vec{x}) = \frac{K(K-n-1)}{K+1}$$

$$\vec{\mu}_0 = \langle \vec{x} \rangle$$

where "$T_0$" is the precision matrix of the normal-Wishart distribution (an n by n matrix), "$\vec{x}$" represents the variables in the domain, "$cov(\vec{x})$" is the covariance of $\vec{x}$ as determined by the prior network, "K" is the sample size, "n" is the number of variables in the domain, "$\vec{\mu}_0$" is the prior mean of the normal-Wishart distribution (an n by 1 column matrix), and "$\langle \vec{x} \rangle$" is the mean of the variables in the domain as determined by the prior network. The next step of the calculate continuous score routine is sorting the empirical data database so that all cases of complete data appear first in the empirical data database and all cases containing missing data appear last (step 904). The calculate continuous score routine then calculates the sufficient statistics of the complete cases. That is, the sample mean and the multivariate internal scatter matrix (step 906). The sample mean is defined by:

$$\bar{x}_m = \frac{1}{m}\sum_{i=1}^{m}\vec{x}_i$$

where "$\vec{x}_m$" refers to the sample mean, "m" is the number of complete cases in the database, and "$\vec{x}_i$" refers to a case. The multivariate internal scatter matrix is otherwise known as the multidimensional variance of the data and is defined by:

$$S_m = \sum_{i=1}^{m}(\vec{x}_i - \bar{x}_m)(\vec{x}_i - \bar{x}_m)'$$

where "$S_m$" refers to the multivariate internal scatter matrix, where "$\vec{x}_i$" refers to a case, and where "$\bar{x}_m$" refers to the sample mean. The mark refers to the transpose in which the matrix is rearranged from being an "n by 1" to being a "1 by n" matrix, and multiplied together so as to render an "n by n" column matrix.

The calculate continuous score routine next combines the intermediate statistics obtained from steps 902 and 906 (step 908). In this step, $T_0^{n \times n}$ (indicating that $T_0$ is an n by n matrix) is combined with the multivariate internal scatter matrix and a term involving the sample mean and prior mean to create $T_m^{n \times n}$. In this step, the following is computed:

$$T_m^{n \times n} = T_0^{n \times n} + S_m^{n \times n} + \frac{Km}{K+m}(\vec{\mu}_o - \bar{x}_m)(\vec{\mu}_o - \bar{x}_m)'$$

where "K" is the sample size, "m" is the number of complete cases in the empirical data database, "$T_0$" is the precision matrix of the prior normal-Wishart distribution, "$\vec{\mu}_o$" is the prior mean of the normal-Wishart distribution, and "$\vec{x}_m$" is the sample mean.

Next, the calculate continuous score routine of the preferred embodiment selects one variable from the list of nodes to be scored (step 910). After selecting one variable, the calculate continuous score routine calculates a subscore ("the complete data subscore") for that variable and stores the complete data subscore into the node (step 912). The calculate continuous score routine calculates the subscore for one variable by performing the following:

$$subscore[i] = p(B_s^e(i) \mid \xi)\frac{\rho(D^{\vec{x}_i \cap \Pi_i} \mid B_s^e)}{\rho(D^{\Pi_i} \mid B_s^e)}$$

The term "$p(B_s^e(i)|\xi)$" refers to the prior probability of the variable-parent pair $x_i$–$\Pi_i$. Both terms in the fraction are computed using $$\rho(D^R \mid B_{sc}^e) = (2\pi)^{-nm/2}\left(\frac{K}{K+m}\right)^{n/2}\frac{c(n, K)}{c(n, K+m)}|T_0|^{K/2}|T_m|^{-\frac{K+m}{2}}$$

The term "$p(D^R|B_{sc}^e)$" refers to the density of the empirical data database restricted to the set of variables R given the event indicated by the prior network $B_{sc}^e$. Where "n" is the number of variables in R, "K", the sample size, "m", the number of complete cases in the empirical data database, "$|T_0|$" is the determinant of $T_0$ restricted to the variables in R, "$|T_m|$" is the determinant of $T_m$ restricted to the variables in R, and c(n,K) is the Wishart normalization function defined as:

$$c(n, K) = \left\{2^{Kn/2}\pi^{n(n-1)/4}\prod_{i=1}^{n}\Gamma\left(\frac{K+1-i}{2}\right)\right\}^{-1}$$

The determinant of an n by n matrix (A) is the sum over all permutations p=($i_1 \ldots i_n$) of the integers 1 through n of the product:

$$(-1)^{k_P}\prod_{j=1}^{n}A[j, i_j]$$

where $k_p$ is 0 if P is even and $k_p$ is 1 if P is odd.

After the calculate continuous score routine of the preferred embodiment calculates a subscore for one variable, the calculate continuous score routine determines if there are more variables to be processed (step 914). If there are more variables in the list of nodes for processing, the calculate continuous score routine continues to step 910, however, if there are no more variables for processing in the test network, the calculate continuous score routine continues to step 916 wherein the calculate continuous score routine determines if there is any missing data (step 916). If there is no missing data, the calculate continuous score routine returns. However, if there is missing data, the calculate continuous score routine processes the empirical data database for missing data (step 918). In this step, the calculate continuous score routine of the preferred embodiment searches the empirical data database for missing data and inserts the mean of the variable having missing data into the empirical data database using the following formula:

$$<x_i> = \int x_i \rho(x_i | x_1, \ldots, x_{i-1}, C_l, \ldots, C_{l-1}, B_{sc}^e) dx_i$$

where "$x_i$" is the value of variable $x_i$ in the lth case, "$<x_i>$" refers to the mean of "$x_i$", "$x_1 \ldots x_{i-1}$" are the variables in the lth case that have been observed, $C_l, \ldots C_l$ are the first 1-1 cases (including complete cases), and $B_{sc}^e$ is the event indicated by the prior network.

This step is readily computed, as the term $\rho(x_i|x_1, \ldots, x_{i-1}, C_l, \ldots, C_{l-1}, B_{sc}^e)$ is a univariate t distribution. The univariate t distribution is well known in the field of statistics. After the processing of this step, all cases are made complete in the empirical data database.

The calculate continuous score routine of the preferred embodiment next computes the subscores for each variable in the domain as described in steps 910 through 914 for complete cases thus rendering a "missing data subscore," multiplies the missing data subscore by the complete data subscore and stores the multiplied score as the subscore for each node (step 920). Finally, the calculate continuous score routine calculates the total score by multiplying all subscores together (step 922).

The calculate mixed score routine calculates a score for a mixed network and is based on Bayes' theorem. In calculating a score for a mixed network, the preferred embodiment enforces a restriction that the prior network be constructed under the assumption that all dependencies among variables are possible. This restriction is enforced by the knowledge engineer. The preferred embodiment also enforces a restriction that the prior network and all mixed test networks correspond to a collection of conditional Gaussian distributions. This restriction is enforced by the knowledge engineer and the network adjuster, respectively. For the domain of all variables in a mixed network to be a collection of conditional Gaussian distributions, the set of continuous variables "Γ" and the set of discrete variables "Δ" must be divisible into disjoint sets $Γ_1 \ldots Γ_γ$ such that for each set $Γ_i$ there exists a $Δ_i$ subset of Δ such that $Γ_i$ is connected with respect to continuous variables, $Γ_i$ and $Γ_j$ ($i \neq j$) is not connected with respect to continuous variables, no continuous variable is the parent of a discrete variable, every node in $Γ_i$ has parents equal to $Δ_i$, and $Δ_i \cup Γ_i$ is conditional Gaussian. A set R (i.e., $Δ_i \cup Γ_i$) is conditional Gaussian if and only if every discrete variable in R has an arc to every continuous variable in R.

Figure 10:
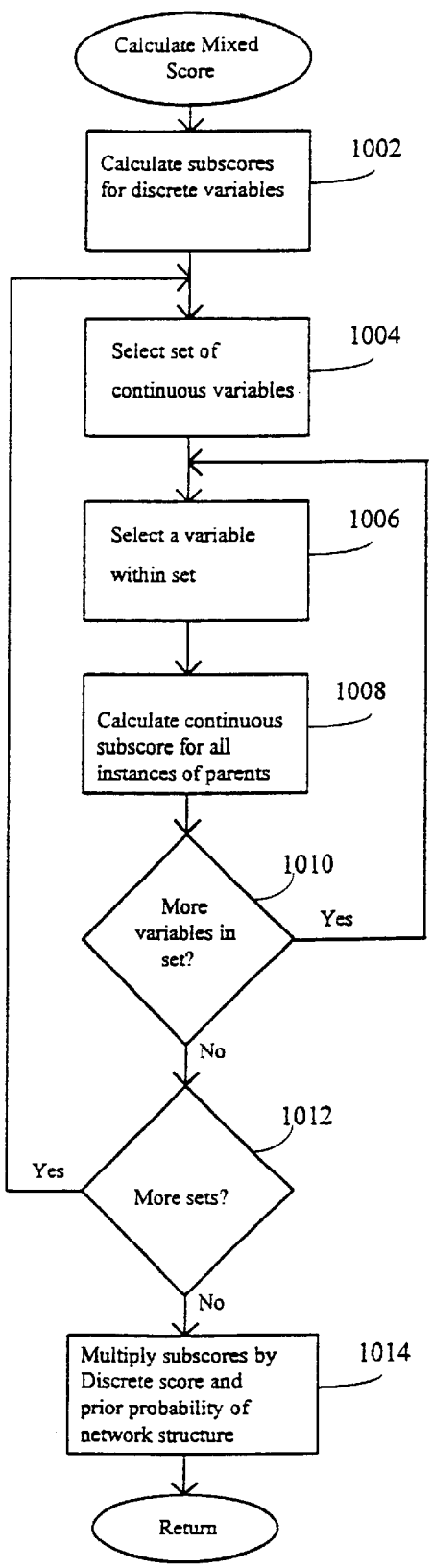
FIG. 10 depicts a flow chart of the steps performed by the calculate mixed score routine of the preferred embodiment.

FIG. 10 depicts the flow chart of the steps performed by the calculate mixed score routine of the preferred embodiment. The thrust of the algorithm performed by the calculate mixed score routine of the preferred embodiment is that, first, the discrete variables are scored. Then, for each subset $Δ_i$ and for each instance of subset $Δ_i$, the scores for the continuous variables in $Γ_i$ are calculated and multiplied together. Lastly, the prior probabilities are multiplied to the corresponding subscores.

The first step that the calculate mixed score routine of the preferred embodiment performs is to calculate the subscore for all discrete variables in the list of nodes to be scored (step 1002). The calculate mixed score routine performs this by invoking the calculate discrete score routine on the test network restricting the nodes scored to only the discrete nodes. The calculate mixed score routine then selects a set of continuous variables "$Γ_i$" from the list of nodes to be scored (step 1004). Next, the calculate mixed score routine selects a variable within "$Γ_i$" for processing (step 1006). After selecting a variable, the calculate mixed score routine calculates a continuous subscore for the selected continuous variable for all instances of the parents of the variable (step 1008). In calculating the continuous subscore for a mixed network, since the mixed network is divided into sets of nodes, the definitions for K, $\mu_0$, and $T_0$, as described relative to the calculate continuous score routine are redefined as a function of i and j (the instance of $Δ_i$).

$$K_{ij} = \min(Kp(Δ_i=j|B_{sc}^e,\xi), n_i)$$

$$\vec{\mu}_{ij} = (Γ_i | Δ_i = j)$$

$$T_{ij} = \frac{K_{ij}(K_{ij} - n_i - 1)}{K_{ij} + 1} cov(Γ_i | Δ^i = j)$$

where "$n_i$" is the number of parents in "$Γ_i$", and "$Δ_i$" are the discrete parents of "$Γ_i$". That is, $K_{ij}$ is redefined as the minimum "min" of "$n_i$" and the sample size "K" times the probability of the discrete parents of "$Γ_i$" equaling instance "j" given the event indicated by the prior network and the knowledge of the expert. "$\vec{\mu}_{ij}$" is redefined as the mean of variables "$Γ_i$" given the discrete parents of "$Γ_i$" that equal instance "j", which is computed from the prior network. "$T_{ij}$" is proportional to the covariance of the variables "$Γ_i$" given the discrete parents of "$Γ_i$" that equal instance "j", which is computed from the prior network.

The calculate mixed score routine then determines if there are more variables in the selected set for processing (step 1010). If there are more variables to be processed, processing continues to step 1006. However, if there are no more variables to be processed, processing continues to step 1012 wherein the calculate mixed score routine determines if there are more sets of continuous variables to be processed. If there are more sets of continuous variables to be processed, then processing continues to step 1004. However, if there are no more sets of continuous variables to be processed, then the calculate mixed score routine continues to step 1014 wherein the calculate mixed score routine multiplies the discrete subscores, the continuous subscores and the priors on structures together. Steps 1004 through 1014 can therefore be described using the following formula:

$$Score(D, B_s^e, \xi) = c \cdot p(B_s^e | \xi) \cdot p(D^Δ | B_s^e, \xi) \cdot \prod_{i=1}^{γ} \prod_{j=1}^{s_i} \prod_{k=1}^{n_i} \frac{p(D^{x_k \Pi_k} | Δ_i = j, B_s^e, \xi)}{p(D^{\Pi_k} | Δ_i = j, B_s^e, \xi)}$$

where "c" refers to a normalization constant, "$p(B_s^e|\xi)$" refers to the priors on structures and the term "$p(D^Δ|B_s^e,\xi)$" refers to the score for the discrete variables in the test network. In addition, the term, $$\prod_{i=1}^{γ} \prod_{j=1}^{s_i} \prod_{k=1}^{n_i} \frac{p(D^{x_k \Pi_k} | Δ_i = j, B_s^e, \xi)}{p(D^{\Pi_k} | Δ_i = j, B_s^e, \xi)}$$

refers to the score for the continuous variables wherein the term "$D_x^{k \Pi_k}$" refers to the database restricted to variables $\{X_k\} \cup \Pi_k$.

Figure 11A:
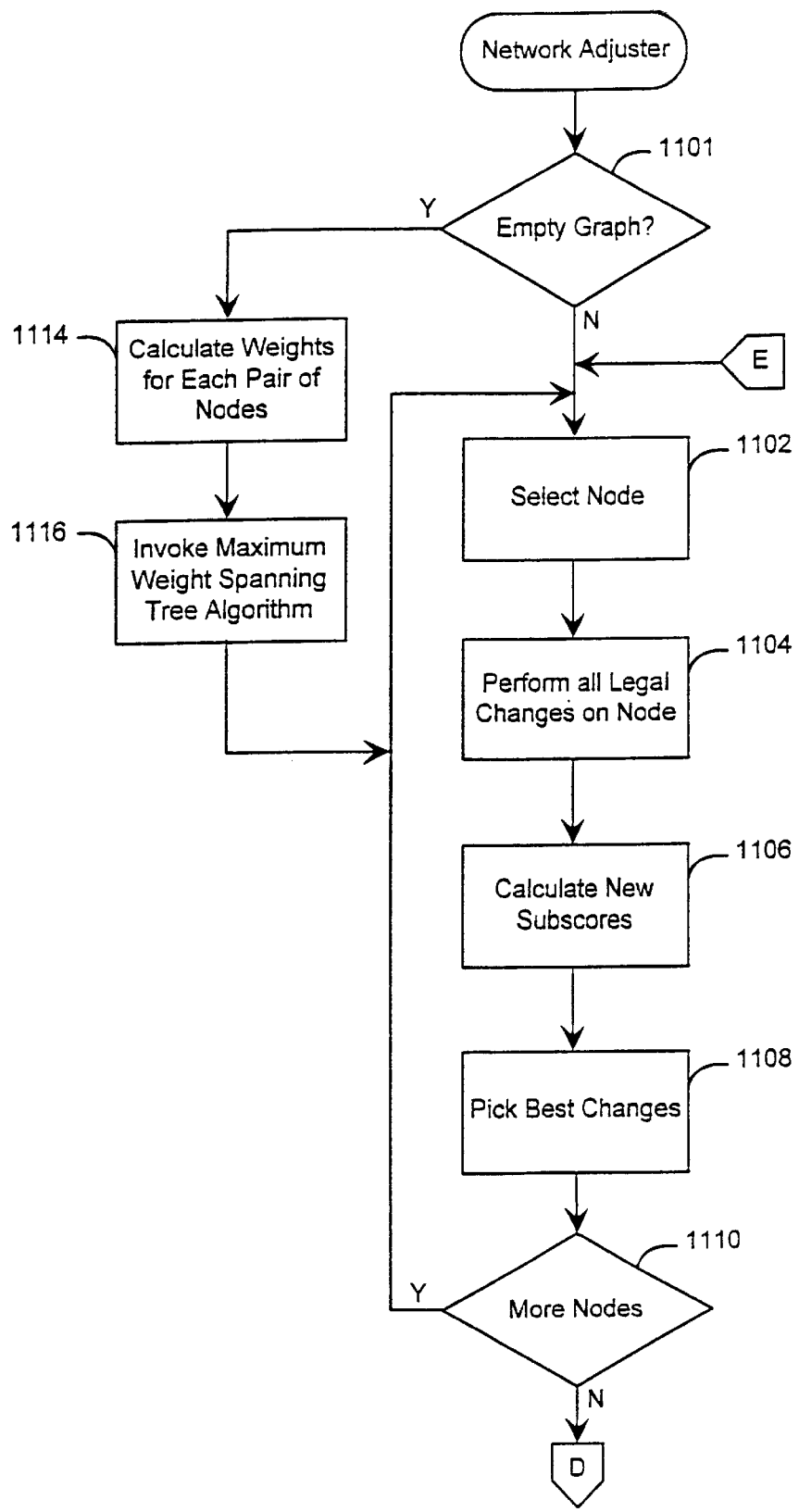
FIGS. 11A and 11B depict a flow chart of the steps performed by the network adjuster of the preferred embodiment.
Figure 11B:
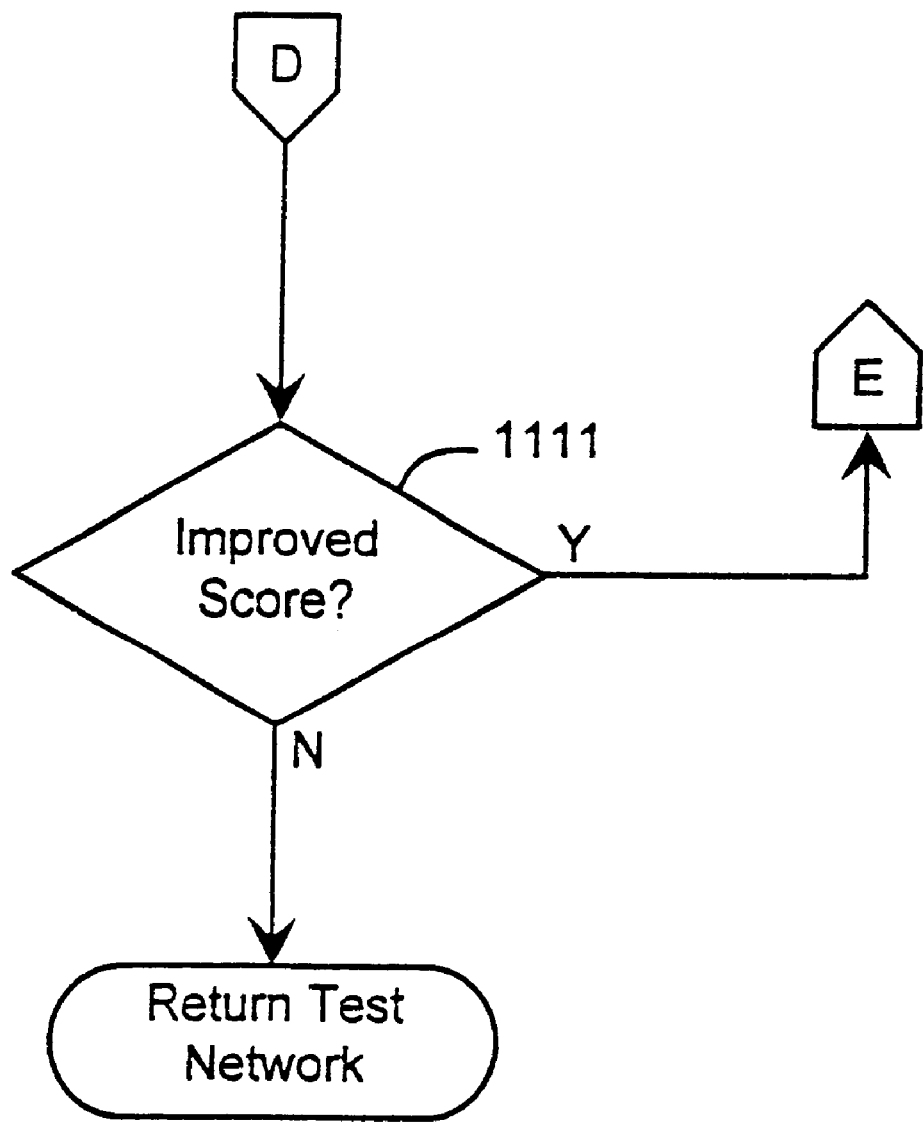

FIGS. 11A and 11B depict a flow chart of the steps performed by the network adjuster 606 of the preferred embodiment of the present invention. The network adjuster 606 of the preferred embodiment performs two functions. First, the network adjuster generates an initial test network if a prior network has not been specified and, second, the network adjuster generates new test networks. If the network adjuster receives a prior network that contains nodes, arcs and probabilities, the network adjuster generates new test networks. If the network adjuster receives a prior network containing only nodes, then the network adjuster first creates a prior network, and then generates new test networks.

The first step of the network adjuster is to determine whether or not the prior network is an empty graph (step 1101). An empty graph is a graph with no arcs or probabilities. If the network adjuster receives a prior network that is an empty graph, then the network adjuster continues to step 1114 wherein the network adjuster calculates weights for all possible pairs of nodes (step 1114). If the prior network is a mixed network, the network adjuster generates arcs among the discrete nodes and among the continuous nodes separately. That is, no arcs between discrete and continuous nodes are generated. The weight for each edge is determined using the following formula:

$$w(x_i, x_j) = \log s(x_i | x_j) - \log s(x_i | \emptyset)$$

where "w" is the weight function, "$x_i$ and $x_j$" denote the two nodes bordering the edge, "$s(x_i|x_j)$" denotes the subscore for the node "$x_i$" with parent "$x_j$", and "$\emptyset$" denotes the empty set. After calculating the weights for each edge, the network adjuster then finds a maximum weight spanning tree, using the maximum weight spanning tree algorithm (step 1116). The maximum weight spanning tree algorithm is a well-known algorithm in the computer-science field. The maximum weight spanning tree algorithm renders an undirected forest where the sum of all the weights in the prior network is a maximum. An undirected forest is a set of undirected trees. After the maximum weight spanning tree algorithm has completed, each edge is oriented so that each node has at most one parent. The prior network then becomes the first test network, and the network adjuster proceeds to step 1102.

If the prior network is not an empty graph, the network adjuster processes the test network stored on the last invocation of the network adjuster (or a newly created prior network from step 1116) and selects a node within the test network for processing, starting with the first (step 1102). The network adjuster then performs all legal single changes on the selected node (step 1104). That is, the network adjuster in sequence: adds an arc to the selected node from each other node (not already directly connected) as long as the new arc does not introduce a directed cycle, deletes each arc pointing to the selected node, and reverses each arc pointing to the selected node as long as the modified arc does not introduce a directed cycle. In addition, if the test network is a mixed network, the network adjuster ensures that the test network remains a collection of conditional Gaussian distributions. The network adjuster next requests the scoring mechanism to generate new subscores for each legal change for the affected nodes (step 1106). The affected nodes are the nodes at either end of an arc change. If there is no missing data, then the preferred embodiment can perform changes on a node-by-node basis because the subscores of each variable obtained for the discrete variable networks, the continuous variable networks, and the mixed networks, are logically independent. This feature is known as score locality. Therefore, due to score locality, if the subscore for the affected nodes improve, it can be ensured that the entire score will improve. The subscores are generated using the calculate discrete score routine, the calculate continuous score routine, or the calculate mixed score routine, depending on the type of the test network. If there is missing data, the subscores may not be independent, and all nodes are affected and need rescoring. The network adjuster then selects the change that produces the best subscore for the affected nodes (step 1108).

After the best change for the selected nodes has been identified, the network adjuster of the preferred embodiment determines whether there are more variables in the test network for processing (step 1110). If there are more variables in the test network for processing, the network adjuster proceeds to step 1102 wherein the next variable in the test network is selected for processing. After all of the variables have been processed, the network adjuster identifies the single change of the best changes selected from step 1108 that most improves the total score of the test network (step 1111). If there is such a change, then the network adjuster stores the test network and the subscores for the affected nodes, and then returns to step 1102. If no change exists that improves the total score, then the network adjuster returns the current test network as the improved belief network 508.

The preferred embodiment provides an improved belief network generator. The network generator of the preferred embodiment generates improved belief networks through the use of both expert knowledge and empirical data. Thus, the belief networks generated by the preferred embodiment are more accurate than conventional belief networks. Additionally, the belief network generator of the preferred embodiment handles continuous variables and missing data in a tractable fashion. The network adjuster of the preferred embodiment is an improved mechanism for manipulating belief networks by creating a prior network when a prior network has not been provided. The network adjuster of the preferred embodiment generates a prior network by utilizing the maximum weight spanning tree algorithm with weights associated with each arc.

While the present invention has been described with reference to a preferred embodiment thereof, those skilled in the art will know of various changes in form that may be made without departing from the spirit and scope of the claimed invention as defined in the appended claims. Such changes may include parallelization of some of the computations described herein or the use of other probability distributions.

What is claimed is:

1. A computer-readable medium whose contents cause a computer system to generate an improved belief network, the computer system having a belief network generator and a belief network containing nodes and arcs indicating a relationship between the nodes, the nodes containing expert data obtained from an expert in a field of expertise, by:

providing the belief network containing the expert data;

providing empirical data containing a plurality of observations for nodes in the provided belief network;

calculating a score for each node in the provided belief network utilizing the empirical data, each score indicating goodness of the node at rendering inferences; and using the calculated node scores and the belief network generator to generate an improved belief network from the provided belief network, the generation accomplished through modifying the arcs of the provided belief network by removing an arc between a first node and a second node and by adding an arc between the first node and a third node, wherein a calculated score for the first node in the improved belief network indicates a higher goodness of the first node than the calculated score for the first node in the provided belief network.

2. The computer-readable medium of claim 1 wherein the empirical data contains a plurality of cases, each case having an observation for the nodes in the provided belief network, the cases having a plurality of types, one type of case being a complete case having an observation for each node, one type of case being a missing data case having at least one node without an observation, and wherein calculating a score for each node includes:

for each node,
calculating a subscore for the node by calculating a mean for the node over the complete cases;
approximating a value for the node in the missing data case without an observation; and
multiplying the subscore by the mean of the approximated values in the missing data cases to create the score.

3. The computer-readable medium of claim 1 wherein the nodes have a plurality of types, one type of node being a continuous type of node having a value selected from a set of continuous values, one type of node being a discrete type of node having a value selected from a set of discrete values, and wherein calculating a score for each node includes:

calculating the score for each discrete node; and
calculating the score for each continuous node.

4. A computer-readable medium containing instructions for controlling a computer system to generate a belief network, by:

receiving a belief network reflecting expert data with nodes and arcs indicating a relationship between the nodes;
receiving empirical data containing a plurality of observations for each node in the belief network;
generating a score for the nodes of the belief network, the score indicating goodness of the belief network at rendering inferences using the empirical data; and
altering the belief network to improve the score for the nodes by modifying an arc, wherein a node whose relationship to another node is indicated by the modified arc has an improved goodness at rendering inferences using the empirical data.

5. The computer-readable medium of claim 4 including repeatedly altering the belief network to generate additional belief networks and generating a score for the generated additional belief networks until a best belief network having a best score is generated.

6. The computer-readable medium of claim 4 wherein the empirical data contains a plurality of cases, each case having observations for the nodes of the belief network, at least one case being a missing data case such that the missing data case is missing an observation for at least one of the nodes of the belief network, and wherein generating a score includes approximating a value for the at least one node in the missing data case.

7. The computer-readable medium of claim 4 wherein a plurality of the nodes are discrete nodes having discrete values, and wherein generating a score includes scoring the discrete nodes.

8. The computer-readable medium of claim 4 wherein a plurality of the nodes are continuous nodes having continuous values, and wherein generating a score includes scoring the continuous nodes.

9. The computer-readable medium of claim 4 wherein the altered belief network is utilized to perform probabilistic inference.

10. The computer-readable medium of claim 4 wherein modifying an arc includes adding or removing an arc, determining affected nodes that are attached to the modified arc and scoring the affected nodes to determine a new score.

11. The computer-readable medium of claim 4 wherein altering the belief network includes storing both the belief network and the generated score before modifying an arc, modifying an arc and thereby generating a new belief network, generating a new score for the new belief network, comparing the score to the new score to determine which among the belief network and the new belief network is a better belief network, and outputting the better belief network.

12. A computer-readable medium containing instructions for controlling a computer system to modify a belief network by:

receiving a belief network reflecting expert knowledge with structural aspects including nodes and arcs connecting the nodes;
receiving empirical data containing a plurality of observations for each node in the belief network;
repeatedly using the empirical data to score the nodes of the belief network for goodness at rendering inferences and modifying the structural aspects of the belief network to generate a new belief network and to improve the score of the nodes of the belief network; and
outputting the belief network with a best score as the improved belief network.

13. The computer-readable medium of claim 12 wherein repeatedly using the empirical data to score the nodes continues until the score does not improve.

14. The computer-readable medium of claim 12 wherein the empirical data contains a plurality of cases, each case having observations for the nodes of the belief network, at least one case being a missing data case such that the missing data case is missing an observation for at least one of the nodes of the belief network, and wherein using the empirical data to score the nodes includes approximating a value for the at least one node in the missing data case.

15. The computer-readable medium of claim 12 wherein a plurality of the nodes of the belief network are discrete nodes having discrete values, and wherein using the empirical data to score the nodes includes scoring the discrete nodes.

16. The computer-readable medium of claim 12 wherein a plurality of the nodes of the belief network are continuous nodes having continuous values, and wherein using the empirical data to score the nodes includes scoring the continuous nodes.

17. A computer-readable medium containing instructions for controlling a computer system to modify a belief network, by:

receiving a belief network reflecting expert data with nodes and arcs indicating a relationship between the nodes;
receiving empirical data containing a plurality of observations for each node in the belief network;
scoring the belief network for goodness at rendering inferences using the empirical data; and
responsive to scoring the belief network, reconnecting at least one of the arcs in the belief network to improve the belief network score.

18. A computer-readable medium containing an improved belief network generated on a computer system by:

receiving a belief network reflecting expert data with nodes and arcs indicating a relationship between the nodes;

receiving empirical data containing a plurality of observations for each node in the belief network;

generating a score for the nodes of the belief network, the score indicating goodness of the belief network at rendering inferences using the empirical data;

altering the belief network to improve the score for the nodes by modifying an arc, wherein a nod e whose relationship to another node is indicated by the modified arc has an improved goodness at rendering inferences using the empirical data; and designating the altered belief network as the improved believed network.

19. The computer-readable medium of claim 18 wherein the improved belief network is used by a computer system to perform probabilistic inference.

20. A computer-readable medium controlling a computer system to generate a modified belief network, by:

receiving a belief network that represents a portion of the world, the belief network comprising nodes and arcs reflecting data received from an expert, each arc connecting two nodes and indicating a relationship between the two nodes;

receiving empirical data containing a plurality of observations for nodes in the belief network, the received data generated empirically from interactions with the represented portion of the world;

generating a score for the received belief network which indicates an ability of the belief network to render inferences which accurately reflect the empirical data, the inferences related to the represented portion of the world;

designating the received belief network to be a current belief network;

repeatedly modifying the current belief network by,
adding or deleting an arc in the current belief network, thereby creating a modified belief network;

generating a new score for the modified belief network which indicates the ability of the modified belief network to render inferences which accurately reflect the empirical data; and when the generated new score is higher than the generated score for the current belief network, designating the modified belief network to be the current belief network; and after repeated modifications, designating the current belief network as the generated belief network.

21. The computer-readable medium of claim 20 wherein each node of the received belief network represents a physical object that is present in the represented portion of the world, wherein an arc between two nodes represents a causal relationship between the physical objects represented by the nodes, wherein the empirical data is generated from interactions with the represented physical objects, wherein rendered inferences are related to the represented physical objects, and wherein the received data contains a plurality of observations for each node in the belief network.

22. The computer-readable medium of claim 20 wherein the modifying of the current belief network is performed without adding or deleting nodes.

* * * * *